United States Patent
Li et al.

(10) Patent No.: US 11,989,176 B2
(45) Date of Patent: May 21, 2024

(54) DATA QUERY METHOD AND APPARATUS, DEVICE, AND COMPUTER-READABLE STORAGE MEDIUM

(71) Applicant: Tencent Technology (Shenzhen) Company Limited, Guangdong (CN)

(72) Inventors: Wei Li, Shenzhen (CN); Rui Li, Shenzhen (CN); Mingjin Wu, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 0 days.

(21) Appl. No.: 17/980,380

(22) Filed: Nov. 3, 2022

(65) Prior Publication Data
US 2023/0073666 A1 Mar. 9, 2023

Related U.S. Application Data

(63) Continuation of application No. PCT/CN2021/128244, filed on Nov. 2, 2021.

(30) Foreign Application Priority Data

Dec. 11, 2020 (CN) .......................... 202011452389.5

(51) Int. Cl.
*G06F 16/242* (2019.01)
*G06F 16/28* (2019.01)

(52) U.S. Cl.
CPC ...... *G06F 16/2425* (2019.01); *G06F 16/2428* (2019.01); *G06F 16/244* (2019.01); *G06F 16/283* (2019.01)

(58) Field of Classification Search
CPC ............ G06F 16/2425; G06F 16/2428; G06F 16/244; G06F 16/283; G06F 16/24556;
(Continued)

(56) References Cited

U.S. PATENT DOCUMENTS

2009/0018996 A1* 1/2009 Hunt ..................... G06Q 30/02
2011/0227754 A1* 9/2011 Hill .................. G06F 16/24556
340/870.01
(Continued)

FOREIGN PATENT DOCUMENTS

CN 102682118 A 9/2012
CN 108241692 A 7/2018
(Continued)

OTHER PUBLICATIONS

International Search Report and Written Opinion issued in International Application No. PCT/CN2021/128244, mailed Jan. 29, 2022, with English Translation, 10 pages.

*Primary Examiner* — Evan Aspinwall
(74) *Attorney, Agent, or Firm* — ARENTFOX SCHIFF LLP

(57) ABSTRACT

A data query method is provided. A data query request for a target data model is obtained. Based on the data query request and target metadata corresponding to the target data model, a target physical table corresponding to the data query request is determined from a plurality of physical tables corresponding to the target data model. The target metadata is determined based on the plurality of physical tables. The plurality of physical tables includes a basic table and a pre-aggregated table. The basic table is configured to record basic data of one granularity, and the pre-aggregated table is configured to record data of a plurality of granularities. Target query data corresponding to the data query request is obtained based on the data query request and the target physical table.

19 Claims, 4 Drawing Sheets

(58) Field of Classification Search
CPC ........... G06F 16/2455; G06F 16/24539; G06F 16/22; G06F 16/2228; G06F 16/2477; G06F 16/25; G06F 16/901; G06F 16/2264; G06F 16/2282; G06F 16/2456; Y10S 707/957; Y10S 707/99934; Y10S 707/99932; Y10S 707/954
USPC ........................................................ 707/722
See application file for complete search history.

(56) References Cited

U.S. PATENT DOCUMENTS

| | | | |
|---|---|---|---|
| 2012/0005151 A1* | 1/2012 | Vasudevan | G06F 16/283 707/600 |
| 2012/0089564 A1* | 4/2012 | Bakalash | G06F 16/24556 707/602 |
| 2018/0089328 A1* | 3/2018 | Bath | G06F 16/9538 |
| 2018/0268080 A1* | 9/2018 | Christian | G06F 17/18 |
| 2020/0192959 A1* | 6/2020 | Boyangu | G06F 16/168 |
| 2020/0210452 A1 | 7/2020 | Varshney et al. | |
| 2021/0117437 A1* | 4/2021 | Gibson | G06F 16/258 |

FOREIGN PATENT DOCUMENTS

| | | | |
|---|---|---|---|
| CN | 108572963 A | 9/2018 | |
| CN | 108804459 A | 11/2018 | |
| CN | 112269792 A | 1/2021 | |

\* cited by examiner

```
WITH
    date_id As date_id,
    article_category As article_category,
    article_type As article_type,         → ${Related_Column_Expression_Alias}
    user_age As user_age,
    sum(pv)/sum(uv) As pv_avg
SELECT
    user_age, article_category,           → ${Selected_Dim_List}
    pv_avg                                → ${Selected_Measure}
FROM t2                                   → ${Table}
WHERE 1=1
    AND user_age BETWEEN 20 AND 30 AND date_id = 20200701  → ${Filter}
    AND user_age != 99999999 AND article_category != 'TOTAL' AND article_type = 'TOTAL'  → ${Sub_Table_Dims_Desc}
GROUP BY
    user_age, article_category            → ${Selected_Dim_List}
```

FIG. 5

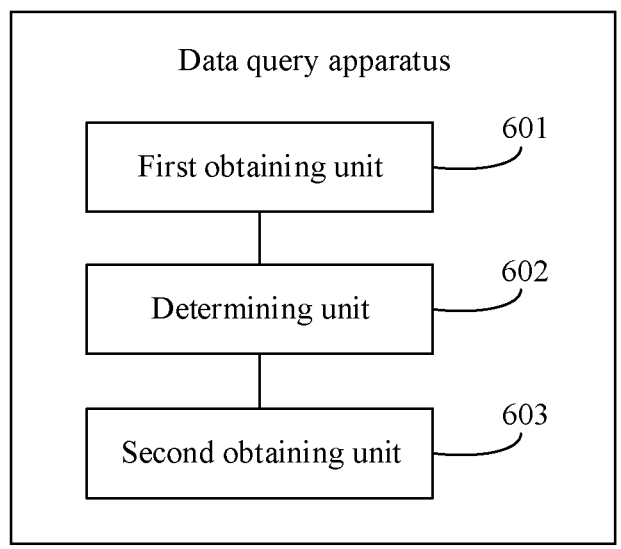

FIG. 6

DATA QUERY METHOD AND APPARATUS, DEVICE, AND COMPUTER-READABLE STORAGE MEDIUM

RELATED APPLICATIONS

The present application is a continuation of PCT/CN2021/128244, entitled "DATA QUERY METHOD AND APPARATUS, DEVICE, AND COMPUTER-READABLE STORAGE MEDIUM" and filed on Nov. 2, 2021, which claims priority to Chinese Patent Application No. 202011452389.5, entitled "DATA QUERY METHOD AND APPARATUS, DEVICE, AND COMPUTER-READABLE STORAGE MEDIUM" and filed on Dec. 11, 2020. The entire disclosures of the prior applications are hereby incorporated by reference in their entirety.

FIELD OF THE TECHNOLOGY

Embodiments of this application relate to the field of computer technologies, including to a data query method and apparatus, a device, and a computer-readable storage medium.

BACKGROUND OF THE DISCLOSURE

In the age of big data, data query is quite important. At present, there are many data query methods, and a data query method implemented based on relational online analytical processing (ROLAP) is a relatively common data query method that provides a decision service. The ROLAP performs data storage through a relational database, and implements data query through tables stored in the relational database.

In the related art, the tables stored in the relational database are summary tables obtained after pre-aggregation calculation is performed according to all combinations of dimensions respectively, and each of the summary tables is used for recording data of one granularity obtained after pre-aggregation calculation is performed according to one combination of the dimensions. In this process, a calculation amount of pre-aggregation calculation can be substantial, leading to a relatively large number of tables stored in the database, a relatively large data storage amount, and a relatively low response speed of data query.

SUMMARY

Embodiments of this disclosure provide a data query method and apparatus, a device, and a non-transitory computer-readable storage medium, which may be used for improving a data query response speed.

According to an aspect, an embodiment of this disclosure provides a data query method. A data query request for a target data model is obtained. Based on the data query request and target metadata corresponding to the target data model, a target physical table corresponding to the data query request is determined by processing circuitry from a plurality of physical tables corresponding to the target data model. The target metadata is determined based on the plurality of physical tables. The plurality of physical tables includes a basic table and a pre-aggregated table. The basic table is configured to record basic data of one granularity, and the pre-aggregated table is configured to record data of a plurality of granularities. Target query data corresponding to the data query request is obtained based on the data query request and the target physical table.

According to another aspect, a data query apparatus including processing circuitry is provided. The processing circuitry is configured to obtain a data query request for a target data model. The processing circuitry is configured to determine, based on the data query request and target metadata corresponding to the target data model, a target physical table corresponding to the data query request from a plurality of physical tables corresponding to the target data model. The target metadata is determined based on the plurality of physical tables. The plurality of physical tables includes a basic table and a pre-aggregated table. The basic table is configured to record basic data of one granularity, and the pre-aggregated table is configured to record data of a plurality of granularities. The processing circuitry is configured to obtain target query data corresponding to the data query request based on the data query request and the target physical table.

According to another aspect, a computer device is provided, including a processor and a memory, the memory storing at least one computer program, the at least one computer program being loaded and executed by the processor, to cause the computer device to implement the data query method according to any one of the foregoing.

According to another aspect, a non-transitory computer-readable storage medium is further provided, storing instructions which when executed by a processor cause the processor to implement the data query method according to any one of the foregoing.

According to another aspect, a computer program product or a computer program is further provided, the computer program product or the computer program including computer instructions, the computer instructions being stored in a computer-readable storage medium, a processor of a computer device reading the computer instructions from the computer-readable storage medium, and the processor executing the computer instructions to cause the computer device to perform the data query method according to any one of the foregoing.

In some embodiments of this disclosure, a data query implementation process depends on the at least two physical tables corresponding to the target data model, and the at least two physical tables corresponding to the target data model include a basic table and a pre-aggregated table after pre-aggregation calculation is performed according to a requirement. That is, physical tables used for implementing data query may be obtained without performing pre-aggregation calculation according to all combinations of dimensions, so that a pre-aggregation calculation amount is relatively small. In addition, data of at least two granularities is recorded through one pre-aggregated table, so that the number of tables stored in a database can be effectively reduced, and a data storage amount is reduced, which is conducive to improve a data query response speed.

BRIEF DESCRIPTION OF THE DRAWINGS

FIG. 5 is a schematic diagram of a target structured query statement according to an embodiment of this disclosure.

FIG. 6 is a schematic diagram of a data query apparatus according to an embodiment of this disclosure.

DESCRIPTION OF EMBODIMENTS

To make the objectives, technical solutions, and advantages of this disclosure clearer, the following further describes the implementations of this disclosure in detail with reference to the accompanying drawings.

The following explains several terms involved in the embodiments of this disclosure.

Structured query language (SQL) is, for example, a query language of structured data, which is used for querying data in a relational database.

Online analytical processing (OLAP) is, for example, a database application manner, and the OLAP is transparent to a user, namely, the user only needs to regard the OLAP as a common database engine and transmit a query request to the OLAP. In addition to storing data of granularities, the OLAP engine further needs to pre-aggregate the number of the granularities in advance and perform redundant storage in a database, so as to implement "conversion from space to time" and achieve a high query speed.

Relational OLAP (ROLAP), for example, uses a relational database (RDB) to perform data storage, and the ROLAP stores pre-aggregated data in the RDB in the form of a plurality of tables. The ROLAP converts an OLAP operation of the user into an SQL and then submits the SQL to the database for execution. To shorten a query response time, the ROLAP may query and position a most suitable table according to a dimension and a measure of the operation of the user. The pre-aggregated data refers to summary data calculated according to different granularities in advance. The OLAP operations may refer to a data query operation, such as rollup, drill down, filter, and merge. A data query method provided in the embodiments of this disclosure is, for example, an ROLAP solution, namely, an online analytical processing solution based on a relational database.

In some embodiments, the data query method provided in the embodiments of this disclosure can be applicable to the field of cloud technologies, and a database configured to store data may be a database under the cloud technologies.

In some embodiments, the data query method provided in the embodiments of this disclosure can be applicable to the field of blockchain technologies, and a database configured to store data may be a database in a database system based on the blockchain technologies (referred to as a "blockchain system").

Figure 1:
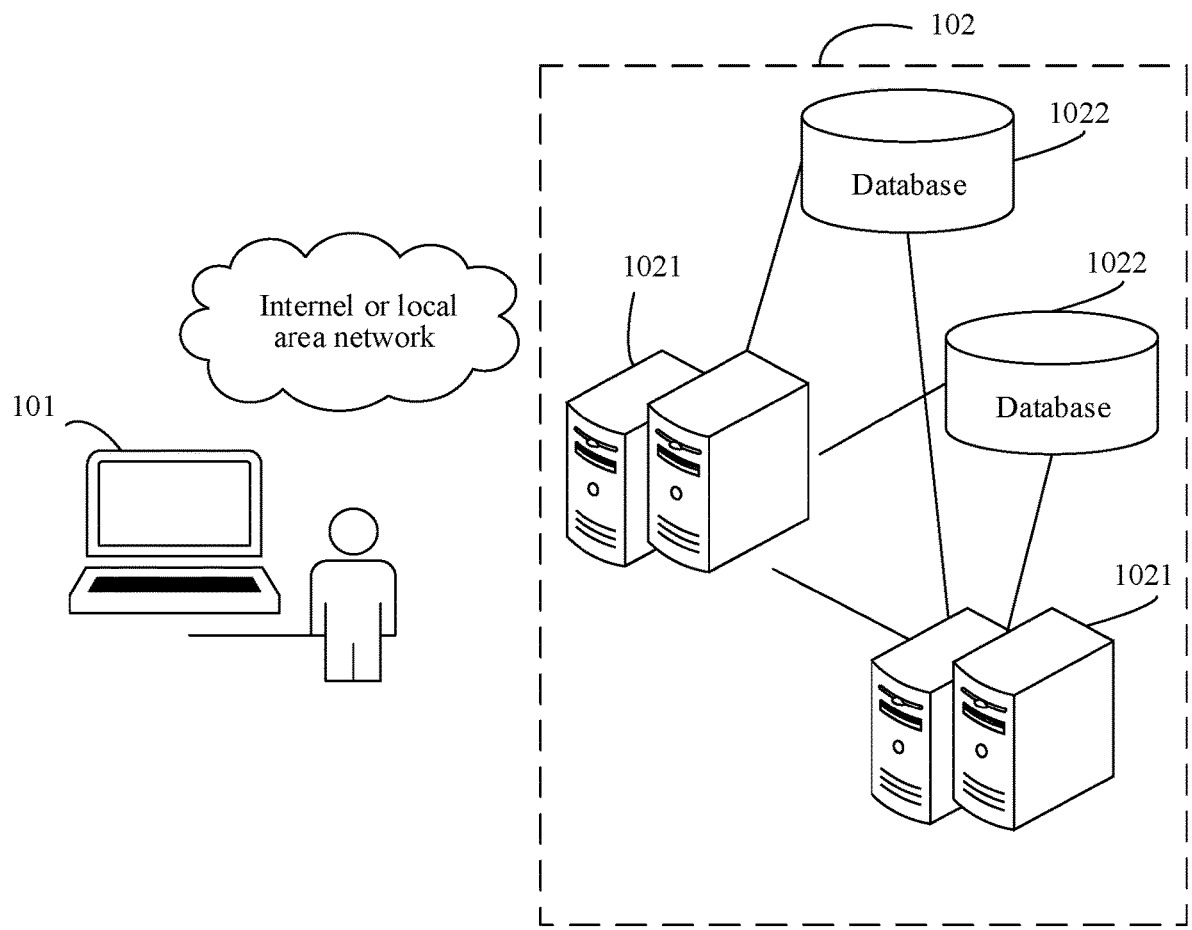
FIG. 1 is a schematic diagram of an implementation environment of a data query method according to an embodiment of this disclosure.

An embodiment of this disclosure provides a data query method, and FIG. 1 shows a schematic diagram of an implementation environment of the data query method provided according to this embodiment of this disclosure. The implementation environment includes: a terminal 101 and a service platform 102. The service platform 102 includes a server 1021 and a database 1022. The server 1021 is configured to obtain target query data corresponding to a data query request, and the database 1022 is configured to store metadata and physical tables. The number of the databases 1022 is not limited in this embodiment of this disclosure, and a database configured to store metadata and a database configured to physical tables may be the same database or may be different databases.

The terminal 101 can transmit the data query request to the server 1021 in the service platform 102 and can also receive the target query data returned by the server 1021 in the service platform 102. The server 1021 can receive the data query request transmitted by the terminal 101, also can obtain target metadata corresponding to a target data model and the target query data corresponding to the data query request from the database 1022, and can further return the target query data to the terminal 101.

In an exemplary embodiment, the terminal 101 can further directly obtain the target metadata corresponding to the target data model and the target query data corresponding to the data query request from the database 1022.

In a possible implementation, the terminal 101 is a smartphone, a tablet computer, a notebook computer, a desktop computer, a smart speaker, or a smartwatch, but is not limited thereto. The server 1021 may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The terminal 101 and the server 1021 may be directly or indirectly connected in a wired or wireless communication manner. This is not limited in this disclosure.

A person skilled in the art is to understand that the terminal 101 and the service platform 102 are only examples, and other terminals or service platforms that are applicable to this disclosure are also to be included in the scope of this disclosure, and are included herein by reference.

Figure 2:
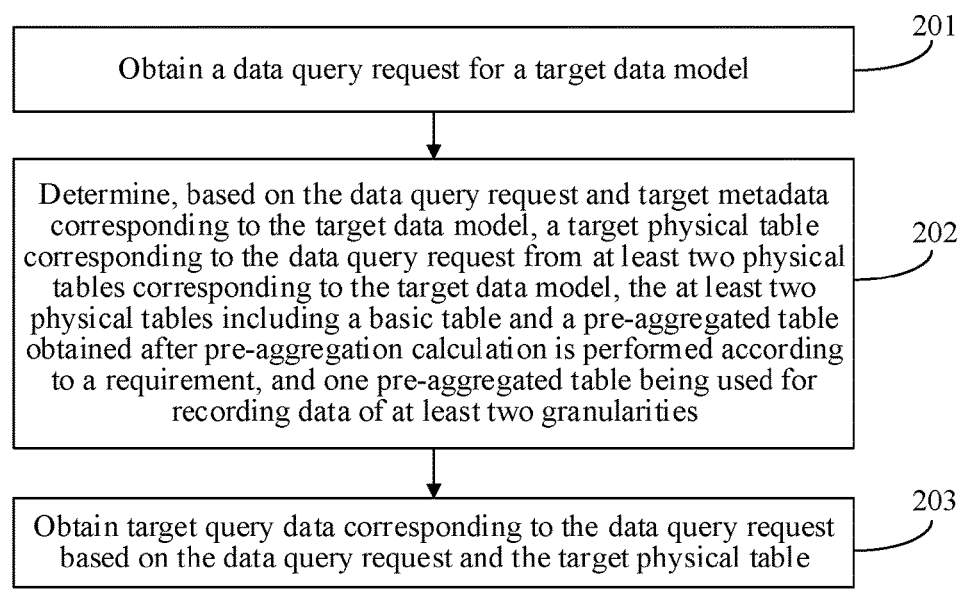
FIG. 2 is a flowchart of a data query method according to an embodiment of this disclosure.

Based on the implementation environment shown in FIG. 1, an embodiment of this disclosure provides a data query method. The method is performed by a computer device, and the computer device may be the terminal 101 or may be the server 1021 in the service platform 102. This embodiment of this disclosure is described by using an example in which the method is applicable to the server 1021 in the service platform 102. As shown in FIG. 2, the data query method provided in this embodiment of this disclosure includes the following step 201 to step 203.

In step 201, a data query request is obtained for a target data model.

The data query request is used for indicating a data query intention of the user, and the data query request is obtained by a terminal and transmitted to a server. Therefore, the server obtains the data query request by receiving the data query request transmitted by the terminal. For example, the terminal in this embodiment of this disclosure refers to a frontend of a data query platform, and the server refers to a backend query engine of the data query platform. For example, in an ROLAP scenario, the server may be regarded as an ROLAP engine.

The target data model is a data model selected from one or more data models provided by the terminal. The data model provided by the terminal may be regarded as a data model provided by the frontend of the data query platform for selection by the user. In this embodiment of this disclosure, the data model is a basic entity providing a data query service, which is similar to a table in a database. The data query request for the target data model is used for indicating a need to perform data query under the target data model.

A basic composition unit of the data model is a column, the column may be divided into a dimension column and a measure column, and one data model may include any number of dimension columns and any number of measure columns. The data model is similar to a concept of "subject" in a data warehouse, and data related to the data model may come from one or more tables, where each table may provide different dimensions and measures. In one data model, measures and dimensions of different tables have same calculation logic, to keep the data consistent. Underlying implementation details of the data model are transparent to the user querying data. During data querying, the user does not need to pay attention to the underlying details of the data model and only needs to clearly express a data model that needs to be queried.

In this embodiment of this disclosure, an arrangement manner of the data model provided by the terminal for selection by the user is not limited. For example, the data model is arranged according to a data analysis function that can be provided by the data query platform, and different data analysis functions correspond to different data models.

In a possible implementation, the data query request carries a to-be-queried dimension, a to-be-queried measure, and filter condition information. The to-be-queried dimension refers to a dimension selected by the user, and the dimension refers to an angle at which data is observed; the to-be-queried measure refers to a measure selected by the user, and the measure refers to a statistical value being observed; and the filter condition information is used for indicating a filter condition selected by the user.

In an exemplary embodiment, the data query request carries only one to-be-queried measure. In an exemplary embodiment, the data query request does not carry any to-be-queried dimension, that is, the user does not select any dimension. In an exemplary embodiment, the data query request does not carry any filter condition information, that is, the user does not select any filter condition.

The data query request for the target data model is determined by the terminal according to a selection operation of the user on the data query platform. The user may perform a drag operation on dimensions and measures through a mouse according to a requirement of the user, to query data of various granularities, instead of only querying data of a fixed granularity through a common fixed report. In this embodiment of this disclosure, the data model is used as a basic entity providing data query, and the user is to specify a data model before data query is performed. The underlying details of the data model are hidden for the user, and only the dimensions and the measures in the data model are visible for the user.

Figure 3:
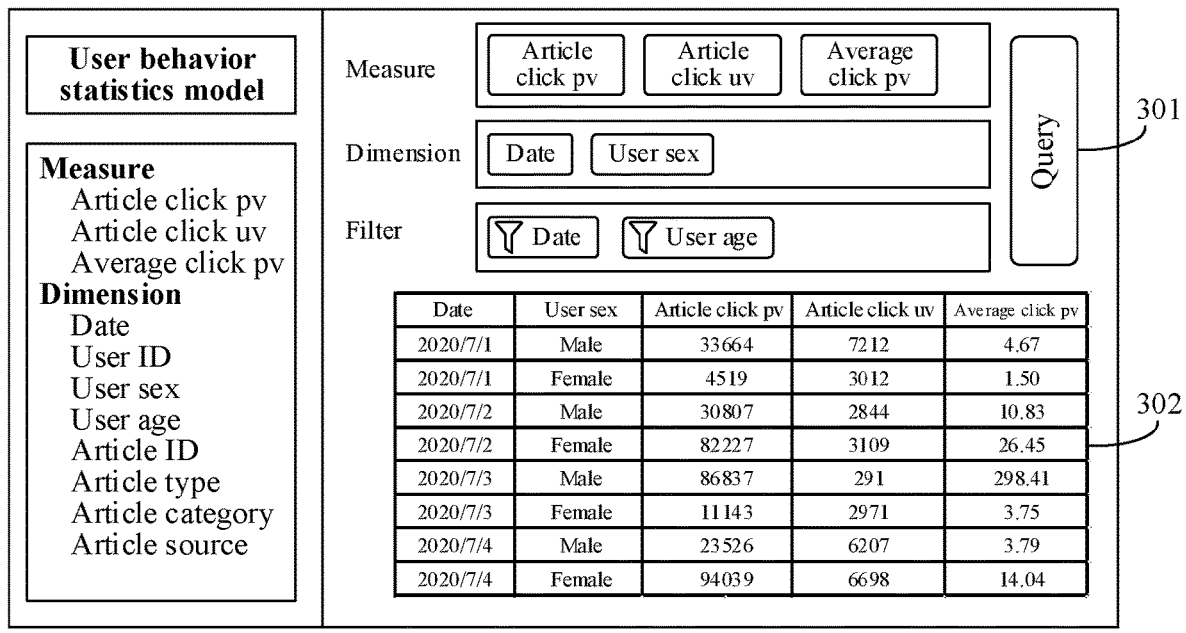
FIG. 3 is a schematic diagram of an interface of a data query platform according to an embodiment of this disclosure.

For example, FIG. 3 shows a schematic diagram of an interface of a data query platform. In FIG. 3, a data model specified by the user (namely, a target data model) is a user behavior statistics model, and measures in the user behavior statistics model include article click page view (pv), article click unique visitor (uv), and average click pv. Dimensions in the user behavior statistics model include data, user identity document (ID), user set, user age, article ID, article type, article category, and article source. The measure selected by the user includes the article click pv, article click uv, and average click pv, the dimension selected by the user includes the data and the user sex, and the filter condition selected by the user includes constraints on the data and the user age. After the user clicks a "query" button 301 in FIG. 3, the terminal obtains a data query request for a target data model.

In this embodiment of this disclosure, a presentation form of the data query request is not limited, provided that a query intention of the user can be accurately expressed. For example, this embodiment of this disclosure provides a presentation form of a logic SQL to describe the data query request of the user.

The logic SQL cannot be directly executed in an RDB and needs to be converted into a physical SQL that can be recognized by a database, which is therefore referred to as a logic SQL. For example, the logic SQL uses a format of JavaScript Object Notation (JSON) for presentation, and the format of the logic SQL is as follows:

```
{
  "SELECT": {
    "Selected_Dim_List": ${ Selected_Dim_List},
    "Selected_Measure": ${ Selected_Measure}
  },
  "FROM": ${Model_ID},
  "WHERE": ${Filter}
}
```

In the format of the logic SQL, "SELECT", "Selected_Dim_list", "Selected_Measure", "FROM", and "WHERE" are all keywords. ${Selected_Dim_List}, ${Selected_Measure}, ${Model_ID}, and ${Filter} are parts that need to be filled, and the 4 parts that need to be filled are respectively described below.

${Selected_Dim_List} is an array used for representing the dimension selected by the user, and the array may include one or more dimensions or may be empty. When the array is empty, it indicates that the user does not select any dimension. The dimension selected by the user is referred to as a to-be-queried dimension in the embodiments of this disclosure.

$ {Selected_Measure} is a character string used for representing the measure selected by the user, and it is required that only one measure is selected in the embodiments of this disclosure. The measure selected by the user is referred to as a to-be-queried measure in the embodiments of this disclosure.

$ {Model_ID} is a character string used for representing a model identifier of the target data model that the user intends to query.

$ {Filter} is a JSON used for representing the filter condition selected by the user, which is a nested structure. The JSON includes 2 members: AND_OR (a relationship between filter conditions) and Filter_List (a filter condition list). The Filter_List is an array, and a member in the array may be a specific SQL filter expression or may be a ${Filter}. According to an actual situation of the user, the ${Filter} may be empty, and empty indicates that the user does not select any filter condition.

For example, an instance of the data query request is as follows:

```
{
  "SELECT": {
    "Selected_Dim_List": ["user_age", "article_category"],
    "Selected_Measure": "pv_avg"
  },
  "FROM": "123",
  "WHERE":{
```

```
    "AND_OR": "AND",
    "Filter_List": ["user_age BETWEEN 20 AND 30", "date_id =
20200701"]
  }
}
```

The instance of the data query request represents such a query intention: querying an "average click pv" of users aged from 20 to 30 on various article categories on 20200701 in a No. 123 model.

In step 202, based on the data query request and target metadata corresponding to the target data model, a target physical table corresponding to the data query request is determined from at least two physical tables corresponding to the target data model, the at least two physical tables including a basic table and a pre-aggregated table obtained after pre-aggregation calculation is performed according to a requirement, and one pre-aggregated table being used for recording data of at least two granularities. In an example, based on the data query request and target metadata corresponding to the target data model, a target physical table corresponding to the data query request is determined by processing circuitry from a plurality of physical tables corresponding to the target data model, the target metadata being determined based on the plurality of physical tables, the plurality of physical tables including a basic table and a pre-aggregated table, the basic table being configured to record basic data of one granularity, and the pre-aggregated table being configured to record data of a plurality of granularities.

The target metadata is determined based on the at least two physical tables, and the basic table is used for recording basic data.

After the data query request is obtained, the server determines, based on the data query request and the target metadata corresponding to the target data model, the target physical table corresponding to the data query request from the at least two physical tables corresponding to the target data model. The target metadata corresponding to the target data model is determined based on the at least two physical tables corresponding to the target data model, and the target metadata corresponding to the target data model is used for describing the target data model in detail. The at least two physical tables corresponding to the target data model refer to tables used for implementing the target data model. In the embodiments of this disclosure, the at least two physical tables corresponding to the target data model include a basic table and a pre-aggregated table obtained after pre-aggregation calculation is performed according to a requirement, where the basic table is used for recording basic data, and one pre-aggregated table is used for recording data of at least two granularities. Data of different granularities relates to different dimensions. For example, the thickness of the granularity of the data is used for indicating the number of dimensions related to the data, and a greater number of dimensions related to the data indicates a thinner granularity of the data. The numbers of dimensions related to the data of at least two granularities recorded in one pre-aggregated table may be the same or may be different, which is not limited in the embodiments of this disclosure, provided that the related dimensions are different.

In a possible implementation, the basic table refers to a fact table in common senses in a data warehouse, which is used for recording basic data on which no pre-aggregation calculation is performed, and each basic table is used for recording data of one granularity. In the embodiments of this disclosure, the number of basic tables and the number of pre-aggregated tables included in the at least two physical tables corresponding to the target data model are not limited. That is, the at least two physical tables may include one or more basic tables and one or more pre-aggregated tables.

For example, the basic table included in the at least two physical tables corresponding to the target data model includes at least one basic table of a thinnest granularity, and the basic table of the thinnest granularity can provide all dimensions and measures required by the user and can also provide a measure query result of any dimension combination. In addition to the basic table of the thinnest granularity, the at least two physical tables corresponding to the target data model may further include one or more basic tables determined according to a requirement, which is not limited in the embodiments of this disclosure. The at least two physical tables corresponding to the target data model may further include one or more pre-aggregated tables obtained after pre-aggregation calculation is performed according to a requirement. For example, the requirement is transmitted by the user through the terminal or obtained by the server through analysis according to a historical query record of the user, which is not limited in the embodiments of this disclosure, and the requirement can indicate information such as dimensions and measures that the user usually needs to query. A process of obtaining the pre-aggregated table through pre-aggregation calculation according to the requirement may be manually performed by a developer or may be automatically performed by a written program, which is not limited in the embodiments of this disclosure.

The basic table and the pre-aggregated table in the at least two physical tables corresponding to the target data model may be autonomously determined by the developer according to an actual requirement, and the numbers of the tables are not limited. Each table may be a combination of different dimensions and measures. In this way, aggregation does not need to be performed for 2N times for summary of N (N is an integer not less than 1) dimensions, thereby greatly reducing a calculation amount and a data storage amount of measure aggregation.

Before step 202 is implemented, the at least two physical tables corresponding to the target data model need to be obtained first, the target metadata corresponding to the target data model is then determined according to the at least two physical tables corresponding to the target data model, and the at least two physical tables and the target metadata are stored. In a possible implementation, a process of storing the at least two physical tables and the target metadata is as follows: storing the at least two physical tables corresponding to the target data model into a first database, and storing the target metadata into a second database. The first database and the second database may be the same database or may be different databases, which is not limited in the embodiments of this disclosure. This embodiment of this disclosure is described by using an example in which the first database and the second database are different databases. For example, the first database is further referred to as a relational database, and the second database is further referred to as a metabase.

In an exemplary embodiment, the server may obtain the target metadata corresponding to the target data model from the metabase configured to store metadata based on the data query request.

The ROLAP is implemented based on a plurality of physical tables stored in the RDB, but a relationship among physical tables is hidden to the user, and only the dimension columns and the measure columns of the data model are visible to the user. The plurality of physical tables are mapped into one data model, which requires to be performed in the metabase. The metabase refers to a library storing metadata corresponding to the data model, and the metadata corresponding to the data model includes data model information, physical table information, and column information. The server implements data query based on the metabase.

A form of the metadata corresponding to the data model is set according to experience or is flexibly adjusted according to an application scenario, which is not limited in the embodiments of this disclosure, provided that the server can implement a data query service based on the metadata. In an exemplary embodiment, the metadata corresponding to the data model is presented by using six metadata tables generated according to formats indicated by the following Table 1 to Table 6.

TABLE 1

| Primary key | Column name | Data type | Meaning |
|---|---|---|---|
| * | model_id | int | Model ID |
| * | column_name | string | Column name |
|  | column_type | string | Column type (dim: dimension, measure: measure) |
|  | column_data_type | string | Data type (int: integral type, date: date type, float: float type, string: character string type) |

TABLE 2

| Primary key | Column name | Data type | Meaning |
|---|---|---|---|
| * | model_id | int | Model ID |
| * | column_name | string | Column name |
| * | table_name | string | Table name of physical table |
|  | column_expression | string | Column expression, SQL expression |

TABLE 3

| Primary key | Column name | Data type | Meaning |
|---|---|---|---|
| * | model_id | int | Model ID |
| * | table_name | string | Table name of physical table |
| * | measure | string | Measure |
|  | aggr_dims | string | Aggregatable dimension list |
|  | non_aggr_dims | string | Non-aggregatable dimension list |

TABLE 4

| Primary key | Column name | Data type | Meaning |
|---|---|---|---|
| * | model_id | int | Model ID |
| * | table_name | string | Table name of physical table |
|  | table_type | string | Type of physical table (group/cube/rollup/groupingsets) |
|  | comb_dims | string | Pre-aggregation dimension list; and set basic table to empty |
|  | other_dims | string | Dimension list other than pre-aggregation dimension list |

TABLE 5

| Primary key | Column name | Data type | Meaning |
|---|---|---|---|
| * | model_id | int | Model ID |
| * | table_name | string | Table name of physical table |
| * | sub_table_comb_subset | string | Dimension combination subset corresponding to subtable; and set basic table to empty |
|  | sub_table_all_dims | string | All dimensions in subtable |
|  | sub_table_dims_cnt | string | Number of dimensions in subtable |

TABLE 6

| Primary key | Column name | Data type | Meaning |
|---|---|---|---|
| * | model_id | int | Model ID |
| * | table_name | string | Table name or parent table of physical table |
| * | sub_table_comb_subset | string | Dimension combination subset corresponding to subtable; and set basic table to empty |
| * | measure | string | Measure |
|  | non_aggr_dims | string | Non-aggregatable dimension list |

The metadata table generated according to the format indicated by Table 1 is used for describing column components of the data model and indicating whether the column is a dimension or a measure. The metadata table generated according to the format indicated by Table 2 is used for defining a source of physical tables of each column in the data model and a calculation expression of each column (referred to as a column expression, which is essentially an SQL expression). The metadata table generated according to the format indicated by Table 3 is used for determining aggregatable dimensions and non-aggregatable dimensions corresponding to each measure in the data model. In different physical tables, the aggregatable dimensions corresponding to each measure may be the same or may be different; and the non-aggregatable dimensions corresponding to each measure may be the same or may be different. The metadata table generated according to the format indicated by Table 4 is used for describing physical tables forming the data model and a type of each physical table forming the data model, where group represents a basic table, cube represents pre-aggregated tables of a first type, rollup represents pre-aggregated tables of a second type, and grouping sets represents pre-aggregated tables of a third type. For example, the metadata tables generated according to the formats indicated by Table 1 to Table 4 are all obtained through filling by the developer according to actual physical tables.

The metadata table generated according to the format indicated by Table 5 is used for describing subtables forming the data model, where each subtable corresponds to one granularity. For example, the metadata table generated according to the format indicated by Table 5 is generated depending on the metadata table generated according to the format indicated by Table 4, and a generation process may be automatic calculation and generation according to a written program. The metadata table generated according to the format indicated by Table 6 is used for describing non-aggregatable dimensions of each measure in a subtable.

For example, the metadata table generated according to the format indicated by Table 6 is generated depending on the metadata tables generated according to the formats indicated by Table 3 and Table 5, and a generation process may be automatic calculation and generation according to a written program.

The following describes related concepts involved in Table 1 to Table 6.

(1) Introduction of a dimension column and a measure column.

A column, also referred to as a field, is a basic composition unit of a table in an RDB. One table includes a plurality of columns, and the columns are divided into different data types, such as int and string. However, in this disclosure, in addition to serving as the basic composition unit of the table, the column is also a basic composition unit of a data model, and the column of the data model is a logic concept that needs to be mapped onto a physical column of a table through specific calculation logic. The column is divided into two types: a dimension column and a measure column.

A dimension is originally a concept in data warehouse design and is formed by a primary key and related attributes. For example, in a user dimension shown in FIG. 7, a user_id column is a dimension primary key, and 4 columns of user_sex, user_name, user_age, and user_city are dimension attributes. In this disclosure, the 5 columns are collectively referred to as dimension columns.

TABLE 7

| Type | Column name | Data example |
|---|---|---|
| Primary key | user_id | abcd132 |
| Attribute | user_sex | F |
| | user_name | San Zhang |
| | user_age | 23 |
| | user_city | Beijing |

TABLE 8

| Column type | English column name | Chinese column name |
|---|---|---|
| Dimension | date | Date |
| | user_sex | User sex |
| | article_type | Article type |
| Measure | read_duration | Total read duration |

A measure is a concept relative to the dimension, and the measure is a value-type statistical amount, such as pv, uv, and duration. For example, in Table 8, columns of data, user_sex, and article_type are dimension columns, and a read duration column is a measure column. For example, an information mobile phone application program is used as an example, in a scenario that the user clicks an information article for browsing in the application program, uv refers to the number of users clicking the article, and deduplication calculation needs to be performed on the users; pv refers to the number of times that the user clicks the article; and duration refers to a read duration of the user for the article.

(2) Introduction of aggregatable and non-aggregatable measures.

Aggregatable and non-aggregatable are said for the measure. Whether a measure is aggregatable is related to a specific dimension and also related to a specific table. Pre-aggregation calculation of a measure is pre-aggregation calculation performed under aggregatable dimensions of the measure. The following describes aggregatable and non-aggregatable measures in combination with instances of Table 9 and Table 10.

TABLE 9

| date | user_sex | Uv |
|---|---|---|
| 2020 Jan. 2 | female | 3 |
| 2020 Feb. 2 | female | 2 |
| 2020 Jan. 2 | male | 2 |
| 2020 Feb. 2 | male | 1 |

TABLE 10

| date | user_id | user_sex | article_id | pv |
|---|---|---|---|---|
| 2020 Jan. 2 | u01 | female | k0858c | 3 |
| 2020 Jan. 2 | u02 | male | k0859c | 11 |
| 2020 Jan. 2 | u03 | female | k0860c | 13 |
| 2020 Jan. 2 | u01 | female | laFW14 | 17 |
| 2020 Jan. 2 | u02 | male | laFW15 | 16 |
| 2020 Feb. 2 | u01 | female | laFW14 | 9 |
| 2020 Feb. 2 | u02 | male | k0858c | 14 |
| 2020 Feb. 2 | u03 | female | laFW14 | 7 |

In the foregoing Table 9 and Table 10, pv and uv are measure columns, and other columns are dimension columns. An example in which uv is queried by using an SQL query statement from the 2 tables is used. When query is performed on Table 9, query can be performed by using a sum(uv) function, but summary can only be performed on the user_sex dimension and cannot be performed on the data dimension. Because one user_id only corresponds to one user_sex, a sum of the number of male users and the number of female users is equal to the total number of users. Therefore, the user_id may not be calculated repeatedly, that is, the user_id may not be repeated on the user_sex dimension. However, the user_id may be repeated on the data dimension. Therefore, in Table 9, uv is non-aggregatable for the data dimension but is aggregatable for the user_sex dimension, that is, whether a measure is aggregatable is related to a specific dimension.

The situation differs when query is performed on Table 10. No matter summary is calculated on any dimension, an aggregation function of count(distinct user_id) can be used, where the aggregation function is deduplication calculation, so that the user_id may not be calculated repeatedly. Therefore, in Table 10, uv is aggregatable for the data dimension, that is, whether a measure is aggregatable is related to a specific table.

(3) Introduction of a basic table and a pre-aggregated table.

The table mentioned in this disclosure refers to a physical table in a database. In this disclosure, to optimize storage, a storage manner of a basic table and a pre-aggregated table is proposed.

The basic table is a fact table in common senses in a data warehouse and is formed by dimension columns and measure columns. For example, in the basic table shown in Table 11, date_id, user_sex, and article_type are dimension columns, and pv is a measure column. A dimension set {date_id, user_sex, article_type} is a granularity representation of Table 11. One basic table only stores data of one granularity.

TABLE 11

| date_id | user_sex | article_type | pv |
|---|---|---|---|
| 2020 Apr. 13 | male | Image-text | 499 |
| 2020 Apr. 13 | male | Video | 714 |
| 2020 Apr. 13 | female | Image-text | 855 |
| 2020 Apr. 13 | female | Video | 273 |

The pre-aggregated table is different from the basic table, and an objective of designing the pre-aggregated table is to store data of a plurality of granularities in one table. Different granularities are distinguished by summary identifiers on the dimension columns. In an exemplary embodiment, the summary identifiers make corresponding agreements according to different data types. For example, a summary identifier corresponding to a string type is TOTAL; a summary identifier corresponding to an int type is 99999999; and a summary identifier corresponding to a date type is 2099-12-31. During actual development, the summary identifiers need to be defined as keywords to prevent the summary identifiers from being mixed with real data. For example, in the pre-aggregated table shown in Table 12, the user_sex column and the article_type column include the summary identifier TOTAL. A meaning of data of a $3^{rd}$ column in Table 12 is that: a uv corresponding to all male on 20200413 is 1105; a meaning of data of a $7^{th}$ column in Table 12 is that: a uv corresponding to an image-text article on 20200413 is 1022; and a meaning of data of a $9^{th}$ column in Table 12 is that: a total uv on 20200413 is 1708.

TABLE 12

| date_id | user_sex | article_type | uv |
|---|---|---|---|
| 2020 Apr. 13 | male | Image-text | 499 |
| 2020 Apr. 13 | male | Video | 714 |
| 2020 Apr. 13 | male | TOTAL | 1105 |
| 2020 Apr. 13 | female | Image-text | 855 |
| 2020 Apr. 13 | female | Video | 273 |
| 2020 Apr. 13 | female | TOTAL | 909 |
| 2020 Apr. 13 | TOTAL | Image-text | 1022 |
| 2020 Apr. 13 | TOTAL | Video | 786 |
| 2020 Apr. 13 | TOTAL | TOTAL | 1708 |

In an exemplary embodiment, the pre-aggregated table may include one or a plurality of types, and different types include different dimension combination manners. In a possible implementation, the pre-aggregated table includes three types, which are respectively a first type (denoted by cube), a second type (denoted by rollup), and a third type (denoted by groupingsets). For example, the cube, rollup, and groupingsets correspond to corresponding summary keywords in Hive_SQL (based on an SQL query statement in a data warehouse tool of Hadoop).

For example, in different types, pre-aggregation dimensions in the same pre-aggregation dimension list {D1, D2, . . . , DN} are combined in different manners, and in different combination manners, obtained dimension combination subsets are also different.

In the first type cube, random combination is performed on the pre-aggregation dimensions in the pre-aggregation dimension list. When the number of the pre-aggregation dimensions in the pre-aggregation dimension list is N (N is an integer not less than 1), the number of dimension combination subsets obtained through random combination is 2N. For example, it is assumed that the pre-aggregation dimensions in the pre-aggregation dimension list are D2 and D3, the number of the dimension combination subsets obtained after random combination is performed on the pre-aggregation dimensions in the pre-aggregation dimension list is 4, which are respectively { }, {D2}, {D3}, and {D2, D3}, where 0 represents an empty set and represents that pre-aggregation calculation is not performed on the D2 and D3 dimensions; {D2} represents that pre-aggregation calculation is performed on the D2 dimension; {D3} represents that pre-aggregation calculation is performed on the D3 dimension; {D2, D3} represents that pre-aggregation calculation is performed on the D2 and D3 dimensions.

For example, it is assumed that the summary identifiers of the dimensions are all TOTAL, for the pre-aggregated table of the first type cube, an SQL query statement select D1, D2, D3, sum(pv) from t group by D1, cube(D2, D3) is equivalent to the following statement.

```
select D1, 'TOTAL', 'TOTAL', sum(pv) from t group by D1
UNION
select D1, 'TOTAL', D3, sum(pv) from t group by D1, D3
UNION
select D1, D2, 'TOTAL', sum(pv) from t group by D1, D2
UNION
select D1, D2, D3, sum(pv) from t group by D1, D2, D3
```

In the second type rollup, layered combination is performed on the pre-aggregation dimensions in the pre-aggregation dimension list, and when the number of the pre-aggregation dimensions in the pre-aggregation dimension list is N (N is an integer not less than 1), the number of dimension combination subsets obtained through layered combination is N+1. For example, it is assumed that the pre-aggregation dimensions in the pre-aggregation dimension list are D2 and D3, the number of the dimension combination subsets obtained after layered combination is performed on the pre-aggregation dimensions in the pre-aggregation dimension list is 3, which are respectively { }, {D2}, and {D2, D3}.

For example, it is assumed that the summary identifiers of the dimensions are all TOTAL, for the pre-aggregated table of the second type rollup, an SQL query statement select D1, D2, D3, sum(pv) from t group by D1, rollup(D2, D3) is equivalent to the following statement.

```
select D1, 'TOTAL', 'TOTAL', sum(pv) from t group by D1
UNION
select D1, D2, 'TOTAL', sum(pv) from t group by D1, D2
UNION
select D1, D2, D3, sum(pv) from t group by D1, D2, D3
```

In the third type groupingsets, separate combination is performed on the pre-aggregation dimensions in the pre-aggregation dimension list, and when the number of the pre-aggregation dimensions in the pre-aggregation dimension list is N (N is an integer not less than 1), the number of dimension combination subsets obtained through separate combination is N. For example, it is assumed that the pre-aggregation dimensions in the pre-aggregation dimension list are D2 and D3, the number of the dimension combination subsets obtained after separate combination is performed on the pre-aggregation dimensions in the pre-aggregation dimension list is 2, which are respectively {D2} and {D3}.

For example, it is assumed that the summary identifiers of the dimensions are all TOTAL, for the pre-aggregated table of the third type groupingsets, an SQL query statement select D1, D2, D3, sum(pv) from t group by D1, groupingsets(D2, D3) is equivalent to the following statement.

```
select D1, D2, 'TOTAL', sum(pv) from t group by D1, D2
UNION
    select D1, 'TOTAL', D3, sum(pv) from t group by D1, D3
```

In an exemplary embodiment, for the pre-aggregated table, in addition to indicating a type (for example, cube, rollup, or groupingsets) of pre-aggregation of the pre-aggregated table, a pre-aggregation dimension list of the pre-aggregated table needs to be further specified, that is, at least one pre-aggregation dimension corresponding to the pre-aggregated table is specified. For example, the pre-aggregation dimension list refers to a list of dimensions after the summary keywords in the Hive_SQL, for example, the cube(D2, D3), the rollup(D2, D3), and the groupingsets(D2, D3) in the foregoing SQL query statement all indicate that {D2, D3} is a pre-aggregation dimension list.

(4) Introduction of a subtable.

The subtable mentioned in the embodiments of this disclosure is a logic concept rather than a physical table actually existing in a database, and a function of the subtable is to provide a metadata service. The subtable is mainly for the pre-aggregated table and is used for describing granularities of data recorded in the pre-aggregated table, and one subtable corresponds to one granularity. The number of subtables corresponding to one pre-aggregated table is equal to the number of granularities of data recorded in the pre-aggregated table, that is, the number of the dimension combination subsets corresponding to the pre-aggregation dimension list. That is, the number of granularities of the data recorded in the pre-aggregated table is the same as the number of the dimension combination subsets corresponding to the pre-aggregation dimension list corresponding to the pre-aggregated table, and one dimension combination subset corresponds to data of one granularity. The dimension combination subsets corresponding to the pre-aggregation dimension list are obtained by combining the pre-aggregation dimensions in the pre-aggregation dimension list.

For example, for the pre-aggregated table of the first type cube, it is assumed that the pre-aggregation dimension list is {D2, D3}, information of subtables corresponding to the pre-aggregated table is shown in FIG. 13 (it is assumed that the summary identifiers are TOTAL).

TABLE 13

| Subtable | Dimension combination subset | Summary representation |
|---|---|---|
| z1 |  | D2 = 'TOTAL' AND D3 = 'TOTAL' |
| z2 | D2 | D2! = 'TOTAL' AND D3 = 'TOTAL' |
| z3 | D3 | D2 = 'TOTAL' AND D3! = 'TOTAL' |
| z4 | D2, D3 | D2! = 'TOTAL' AND D3! = 'TOTAL' |

As can be known from Table 13, for the pre-aggregated table of the first type cube, in a case that the pre-aggregation dimension list is {D2, D3}, the pre-aggregated table corresponds to 4 subtables. The subtable can be represented by using a parent table with a limitation of "summary representation". For example, a subtable z1 is represented in the following manner: SELECT * FROM parent table WHERE D2='TOTAL' AND D3='TOTAL'.

In an exemplary embodiment, a generation rule of summary representation is that: dimensions in the dimension combination subset does not include summary identifiers (for example, TOTAL), and other dimensions in the pre-aggregation dimension list include summary identifiers (for example, TOTAL).

For a basic table in the physical tables, because one basic table only record data of one granularity, a subtable corresponding to the basic table is the basic table, and summary representation of the basic table is empty.

On the premise that the at least two physical tables corresponding to the target data model and the target metadata corresponding to the target data model are prestored, the server determines a target physical table corresponding to the data query request from the at least two physical tables corresponding to the target data model based on the data query request and the target metadata corresponding to the target data model. The target physical table is a physical table that can respond to the data query request in a fastest manner in the at least two physical tables corresponding to the target data model. The target physical table may be a basic table or may be a pre-aggregated table, which is related to actual situations of the data query request and the at least two physical tables.

In a possible implementation, the data query request carries a to-be-queried measure, and a process of determining, based on the data query request and the target metadata corresponding to the target data model, the target physical table corresponding to the data query request from the at least two physical tables corresponding to the target data model includes the following steps.

In a first step a logic dimension set corresponding to the data query request is determined.

The logic dimension set refers to a set of dimensions related to the data query request. A manner for determining the logic dimension set corresponding to the data query request is related to information carried by the data query request. In a possible implementation, in addition to carrying the to-be-queried measure, the data query request further includes the following 4 situations: the data query request further carries a to-be-queried dimension; the data query request further carries filter condition information; the data query request carries a to-be-queried dimension and filter condition information; and the data query request does not carry a to-be-queried dimension and filter condition information.

In different situations, manners for determining the logic dimension set corresponding to the data query request are different. In a possible implementation, the manner for determining the logic dimension set corresponding to the data query request is: forming, in response to that the data query request further carries a to-be-queried dimension, the logic dimension set corresponding to the data query request through the to-be-queried dimension; determining, in response to that the data query request further carries filter condition information, a reference dimension corresponding to the filter condition information, and forming the logic dimension set corresponding to the data query request through the reference dimension; determining, in response to that the data query request further carries a to-be-queried dimension and filter condition information, a reference dimension corresponding to the filter condition information, and using a union of the to-be-queried dimension and the reference dimension as the logic dimension set corresponding to the data query request; and using, in response to that the data query request does not carry a to-be-queried dimension and filter condition information, an empty set as the logic dimension set corresponding to the data query request.

The filter condition information is used for indicating constraints performed by the user on the data query process, the reference dimension corresponding to the filter condition information refers to constrained dimensions in the filter condition information, and the reference dimension corresponding to the filter condition information may be determined by parsing the filter condition information.

For example, for a situation that the data query request is represented by using a logic SQL, all dimensions are recognized from ${Selected_Dim_List} and ${Filter} of the logic SQL to obtain a logic dimension set, and the logic dimension set is denoted by ${Column_Set}.

In a second step, a query condition is determined based on a model identifier of the target data model and the to-be-queried measure; and a first query result matching the query condition is queried from the target metadata. The first query result includes at least one query subresult, and one query subresult includes a table identifier of one physical table corresponding to the target data model.

The query condition is determined based on the model identifier of the target data model and the to-be-queried measure, and is used for indicating information that needs to be queried in the target metadata. For example, if the model identifier of the target data model is denoted by ${Model_ID} and the to-be-queried measure is denoted by ${Selected_Measure}, the query condition is determined based on ${Model_ID} and ${Selected_Measure}.

A representation form of the query condition is not limited in the embodiments of this disclosure, and for example, the representation form of the query condition is an SQL query statement. In an exemplary embodiment, for a situation that the representation form of the query condition is an SQL query statement, the query condition determined based on the model identifier of the target data model and the to-be-queried measure is related to a representation manner of the target metadata. For example, an example in which the target metadata is represented by using six metadata tables generated according to the formats indicated by Table 1 to Table 6 is used, and the query condition determined based on ${Model_ID} and ${Selected_Measure} is represented by using the following SQL query statement.

```
SELECT
    m5.table_name,
    m5.sub_table_comb_subset,
    m5.sub_table_all_dims,
    m6.non_aggr_dims
FROM m5
JOIN m6
ON m5.model_id = m6.model_id
    AND m5.table_name = m6.table_name
    AND m5.sub_table_comb_subset = m6.sub_table_comb_subset
WHERE m5.model_id = ${Model_ID}
    AND m6.measure = ${Selected_Measure}
ORDER BY m5.sub_table_dims_cnt ASC
```

In the foregoing SQL query statement, SELECT, FROM, JOIN, AND, WHERE, ORDER BY, and ASC are all keywords in the SQL, and meanings of related statements involved in the foregoing SQL query statement can be all determined according to the metadata table generated according to the format indicated by Table 5 and the metadata table generated according to the format indicated by Table 6. Details are not described herein again. For example, m5.table name represents a table name of a physical table in the metadata table generated according to the format indicated by Table 5. In this embodiment of this disclosure, that the table identifier is a table name is used as an example. m6.non_aggr_dims represents a non-aggregatable dimension list corresponding to a measure in the metadata table generated according to the format indicated by Table 6. The statement "ORDER BY m5.sub_table_dims_cnt ASC" represents that the numbers of dimensions in subtables in the metadata table generated according to the format indicated by Table 5 are arranged in ascending order. The foregoing SQL query statement is only one exemplary representation manner of the query condition, and the embodiments of this disclosure are not limited thereto.

For example, the process of querying a first query result matching the query condition from the target metadata is to query the first query result matching the query condition from the metadata table generated according to the format indicated by Table 5 and the metadata table generated according to the format indicated by Table 6. The first query result is denoted by Rows_Set_1. The first query result includes at least one query subresult, and one query subresult includes a table identifier of one physical table corresponding to the target data model. The number of query subresults forming the first query result depends on an actual situation. In the embodiments of this disclosure, a type of the table identifier included in the query subresult is not limited. For example, in the embodiments of this disclosure, the table identifier included in the query subresult is a table name, and the table name is a table name of a physical table in the metadata table generated according to the format indicated by Table 5.

In a possible implementation, one query subresult corresponds to one subtable, and one query subresult further includes matching dimensions and non-aggregatable dimensions. The matching dimensions refer to all dimensions in the subtable corresponding to one query subresult, and the non-aggregatable dimensions refer to non-aggregatable dimensions in the subtable of a measure in the subtable corresponding to one query subresult. For example, the matching dimensions included in the at least one query subresult are data in a sub_table_all_dims column in the metadata table generated according to the format indicated by Table 5. The non-aggregatable dimensions included in the at least one query subresult are data in a non_aggr_dims column in the metadata table generated according to the format indicated by Table 6. Matching dimensions included in different query subresults may be the same or may be different; and non-aggregatable dimensions included in different query subresults may be the same or may be different.

In a possible implementation, the at least one query subresult in the first query result is arranged in ascending order of the number of matching dimensions or arranged in descending order of the number of matching dimensions, this is not limited in the embodiments of this disclosure. The number of matching dimensions refers to the number of matching dimensions included in the at least one query subresult. In an exemplary embodiment, the numbers of matching dimensions corresponding to different query subresults may be the same, and in a process of performing arrangement according to the numbers of matching dimensions in ascending order or performing arrangement according to the numbers of matching dimensions in descending order, query subresults corresponding to the same number of matching dimensions are randomly arranged or arranged according to a reference manner, which is not limited in the embodiments of this disclosure.

In a third step, the first query result is filtered based on the logic dimension set to obtain a second query result, and a query subresult meeting a selection condition in the second query result is used as a target query subresult.

The first query result may not include a query subresult implementing a data query service corresponding to the data query request, so that filtering needs to be performed on the first query result based on the logic dimension set to obtain a second query result. In a possible implementation, for a situation that the data query request further carries a to-be-queried dimension and filter condition information, and one query subresult further comprises matching dimensions and non-aggregatable dimensions, the process of filtering the first query result based on the logic dimension set to obtain a second query result includes the following step.

First, a query subresult including matching dimensions not meeting a first condition is deleted from the first query result to obtain a reference query result, where the not meeting a first condition is used for indicating that the included matching dimensions do not include all dimensions in the logic dimension set.

Each query subresult in the first query result includes matching dimensions, and preliminary filtering is performed on the at least one query subresult in the first query result according to the included matching dimensions. In a process of performing preliminary filtering on the at least one query subresult in the first query result according to the included matching dimensions, a query subresult including matching dimensions that do not include all dimensions in the logic dimension set is deleted. The reference query result is obtained after the query subresult including matching dimensions that do not include all dimensions in the logic dimension set is deleted.

That is, after the query subresult including matching dimensions that do not include all dimensions in the logic dimension set is deleted from the first query result Rows_Set_1, a reference query result (denoted by Rows_Set_2) is obtained. That is, it is checked whether data (namely, matching dimensions) in the sub_table_all_dims column included in each query subresult in the Rows_Set_1 includes all dimensions in ${Column_Set}$. If data in the sub_table_all_dims column included in one query subresult does not include all the dimensions in ${Column_Set}$, the query subresult is deleted from the Rows_Set_1. In an exemplary embodiment, the first query result is reflected in the form of a table, each query subresult is one column of data in the table, and in a process of deleting one query subresult from the first query result, a row sequence is kept, namely, an arrangement sequence of the at least one query subresult remains unchanged.

Second, a query subresult including non-aggregatable dimensions not meeting a second condition is deleted from the reference query result to obtain a second query result, where the not meeting a second condition is used for indicating that the included non-aggregatable dimensions include a non-aggregatable dimension that does not belong to the to-be-queried dimension and also does not belong to a dimension corresponding to a single filter condition indicated by the filter condition information.

Each query subresult include non-aggregatable dimensions, and filtering is further performed on each query subresult in the reference query result obtained through preliminary filtering according to the included non-aggregatable dimensions. In a process of further performing filtering on each query subresult in the reference query result obtained through preliminary filtering according to the included non-aggregatable dimensions, a query subresult including non-aggregatable dimensions not meeting the second condition is deleted. The second query result is obtained after the query subresult including non-aggregatable dimensions not meeting the second condition is deleted. The not meeting a second condition is used for indicating that the included non-aggregatable dimensions include a non-aggregatable dimension that does not belong to the to-be-queried dimension and also does not belong to a dimension corresponding to a single filter condition indicated by the filter condition information.

When non-aggregatable dimensions included in one query subresult do not meet the second condition, it indicates that a subtable corresponding to the query subresult cannot implement the data query service indicated by the data query request. The single filter condition indicated by the filter condition information is a filter condition that may not cause aggregation calculation. For example, it is assumed that two filter conditions indicated by the filter condition information are respectively: a date of January 1; and ages between 20 and 30. The filter condition of "a date of January 1" is a single filter condition, and a dimension corresponding to the single filter condition is "date"; and the filter condition of "ages between 20 and 30" is a non-single filter condition, and a dimension corresponding to the non-single filter condition is "age".

That is, checking is performed on each query subresult of the reference query result Rows_Set_2, to check whether data (non-aggregatable dimensions) in the non_aggr_dims column included in each query subresult appears in ${Select_Dim_List}$ or belongs to the dimension corresponding to the single filter condition indicated by ${Filter}$. If data in the non_aggr_dims column of one query subresult includes a dimension that does not appear in ${Select_Dim_List}$ and also does not belong to the dimension corresponding to the single filter condition, the query subresult is deleted from the Rows_Set_2, and a second query result (denoted by Rows_Set_3) is obtained after all query subresults are checked. For example, the reference query result Rows_Set_2 is in a form of a table, each query subresult is one column of data in the table, and the row sequence remains unchanged when the query subresult is deleted.

The foregoing steps are only an exemplary description of an implementation for filtering the first query result based on the logic dimension set to obtain a second query result, and the embodiments of this disclosure are not limited thereto. For example, the process of filtering the first query result based on the logic dimension set to obtain a second query result may alternatively be: deleting a query subresult including non-aggregatable dimensions not meeting the second condition from the first query result to obtain a second reference query result; and deleting a query subresult including matching dimensions not meeting the first condition from the second reference query result to obtain the second query result. For example, the process of filtering the first query result based on the logic dimension set to obtain a second query result may alternatively be: deleting a query subresult including matching dimensions not meeting the first condition or including non-aggregatable dimensions not meeting the second condition from the first query result to obtain the second query result.

The second query result can be obtained no matter which manner is used. After the second query result is obtained, a query subresult meeting a selection condition in the second query result is used as a target query subresult. For example, the query subresult meeting the selection condition in the second query result is a query subresult including the smallest number of matching dimensions. For example, when there are a plurality of query subresults including the smallest number of matching dimensions, any one query subresult is selected from the plurality of query subresults as the target query subresult.

In a possible implementation, the at least one query subresult in the first query result is arranged in ascending order of the number of matching dimensions or arranged in descending order of the number of matching dimensions. In the process of filtering the first query result, the arrangement sequence of the at least one query subresult remains unchanged. That is, an arrangement sequence of query subresults in the second query result is the same as the arrangement sequence of corresponding query subresults in the first query result. In this case, an implementation of using a query subresult meeting a selection condition in the second query result as a target query subresult is: using, in response to that the at least one query subresult in the first query result is arranged in ascending order of the number of matching dimensions, a query subresult ranked first in the second query result as the target query subresult; and using, in response to that the at least one query subresult in the first query result is arranged in descending order of the number of matching dimensions, a query subresult ranked last in the second query result as the target query subresult.

In a fourth step, a physical table indicated by a table identifier included in the target query subresult is determined as the target physical table corresponding to the data query request.

The physical table indicated by the table identifier included in the target query subresult is a physical table meeting requirements of the data query request and having a highest query speed. The physical table indicated by the table identifier included in the target query subresult is determined as the target physical table corresponding to the data query request, so that the target physical table on which implementation of data query directly depends is determined. For example, the table identifier is a table name of a physical table recorded in metadata.

In an exemplary embodiment, if the second query result does not include any query subresult, that is, the Rows_Set_3 is empty, it indicates that the requirements of the data query request cannot be met, and error information is returned to prompt the user that data matching the data query request cannot be queried. For example, the error information is "without support of a corresponding granularity".

Step 203: Obtain target query data corresponding to the data query request based on the data query request and the target physical table.

After the target physical table is determined based on step 202, the target query data corresponding to the data query request is obtained based on the data query request and the target physical table. In a possible implementation, an implementation of step 203 is: determining a target structured query statement based on the data query request and the target physical table; and executing the target structured query statement in a database storing the target physical table, to obtain the target query data corresponding to the data query request.

The data query request cannot be directly recognized by the database, so that the data query request needs to be converted into a structured query statement that can be directly recognized by the database. Forms of structured query statements that can be directly recognized by different databases may be the same or may be different, which is not limited in the embodiments of this disclosure. For example, in a case that the data query request is represented through a logic SQL, the determined target structured query statement herein may be referred to as a physical SQL.

A composition structure of the target structured query statement is related to the database storing the target physical table, which is not limited in the embodiments of this disclosure. In an exemplary embodiment, the target physical table is a pre-aggregated table; the data query request carries a to-be-queried dimension, a to-be-queried measure, and filter condition information; and the target physical table is a physical table indicated by the table identifier included in the target query subresult, and the target query subresult further includes a target dimension combination subset. In this case, the process of determining a target structured query statement based on the data query request and the target physical table includes the following step 1 to step 4.

Step 1: Determine a dimension query statement based on the to-be-queried dimension; determine a measure query statement based on the to-be-queried measure; determine a filter condition query statement based on the filter condition information; and determine a physical table query statement based on the table identifier of the target physical table.

The dimension query statement is used for indicating a dimension that the user needs to query, and the dimension query statement can be directly determined according to the to-be-queried dimension. The measure query statement is used for indicating a measure that the user needs to query, and the measure query statement can be directly determined according to the to-be-queried measure. The filter condition query statement is used for indicating a filter condition selected by the user, and the filter condition query statement can be directly determined according to the filter condition information. The physical table query statement is used for indicating a physical table on which data query depends, and the physical table query statement can be directly determined according to the table identifier of the target physical table.

Step 2: Determine a dimension constraint query statement based on the target dimension combination subset and at least one target pre-aggregation dimension corresponding to the target physical table.

The target dimension combination subset included in the target query subresult is used for indicating a granularity of a subtable corresponding to the target query subresult. For example, the dimension combination subset included in the query subresult is data in the sub_table_comb_subset column in the metadata table generated according to the format indicated by Table 5. The at least one target pre-aggregation dimension corresponding to the target physical table refers to dimensions in a pre-aggregation dimension list corresponding to the target physical table. For example, a pre-aggregation dimension list corresponding to one physical table is obtained from data in the comb_dims column in the metadata table generated according to the format indicated by Table 4 in the target metadata.

The target dimension combination subset is one reference dimension combination subset in at least one reference dimension combination subset determined based on the at least one target pre-aggregation dimension corresponding to the target physical table. A manner for determining at least one reference dimension combination subset based on the at least one target pre-aggregation dimension corresponding to the target physical table varies as the pre-aggregation type of the target physical table varies, and the determined at least one reference dimension combination subset also varies in different determining manners.

The target physical table may be a pre-aggregated table of a first type, a pre-aggregated table of a second type, or a pre-aggregated table of a third type, which is not limited in the embodiments of this disclosure. For related descriptions of the pre-aggregated table of the first type, the pre-aggregated table of the second type, and the pre-aggregated table of the third type, reference may be made to related content in step 202, and details are not described herein again. When the target physical table is a pre-aggregated table of the first type, the at least one reference dimension combination subset is obtained by performing random combination on the at least one target pre-aggregation dimension. When the target physical table is a pre-aggregated table of the second type, the at least one reference dimension combination subset is obtained by performing layered combination on the at least one target pre-aggregation dimension. When the target physical table is a pre-aggregated table of the third type, the at least one reference dimension combination subset is obtained by performing separate combination on the at least one target pre-aggregation dimension.

In a possible implementation, each reference dimension combination subset corresponds to data of one granularity. That is, the number of granularities of data recorded in the target physical table is the same as the number of the at least one reference dimension combination subset.

In a possible implementation, a manner for determining a dimension constraint query statement based on the target dimension combination subset and at least one target pre-aggregation dimension corresponding to the target physical table is: using a dimension in the target dimension combination subset as a first dimension, and determining a first summary identifier corresponding to the first dimension; determining a second summary identifier corresponding to a second dimension, where the second dimension is a dimension other than the first dimension in the at least one target pre-aggregation dimension; and using a query statement used for indicating that the first dimension does not include the first summary identifier and the second dimension includes the second summary identifier as the dimension constraint query statement.

In a possible implementation, the first summary identifier corresponding to the first dimension is determined based on a data type corresponding to the first dimension, and the second summary identifier corresponding to the second dimension is determined based on a data type corresponding to the second dimension. The data type corresponding to the first dimension and the data type corresponding to the second dimension may be known from the metadata table generated according to the format indicated by Table 1 in the target metadata or may be known from a correspondence between dimensions and data types, which is not limited in the embodiments of this disclosure. Different data types correspond to different summary identifiers, and after a data type corresponding to a dimension is determined, a summary identifier corresponding to the dimension is further determined. In an exemplary embodiment, the summary identifier corresponding to the dimension is known from a correspondence between data types and summary identifiers. The correspondence between data types and summary identifiers is set according to experience. For example, a summary identifier corresponding to a string type is TOTAL; a summary identifier corresponding to an int type is 99999999; and a summary identifier corresponding to a date type is 2099-12-31.

After the first summary identifier corresponding to the first dimension and the second summary identifier corresponding to the second dimension are determined, a query statement used for indicating that the first dimension does not include the first summary identifier and the second dimension includes the second summary identifier is used as the dimension constraint query statement. For example, the dimension constraint query statement is used for describing a dimension constraint on a subtable corresponding to the target query subresult, and a representation manner of the dimension constraint query statement is the same as the representation manner of the summary representation of a subtable described in step 202. In an exemplary embodiment, the summary representation of a subtable may be prestored. In this case, the dimension constraint query statement may be directly determined based on the summary representation of the subtable corresponding to the target query subresult.

There may be one or a plurality of first dimensions, which is not limited in the embodiments of this disclosure. In a case that there are a plurality of first dimensions, the data type corresponding to the first dimension refers to a data type corresponding to each of the plurality of first dimensions, and data types corresponding to different first dimensions may be the same or may be different. The first summary identifier corresponding to the first dimension refers to a summary identifier corresponding to each of the plurality of first dimensions determined based on the data type corresponding to each of the plurality of first dimensions. A case that the first dimension does not include the first summary identifier refers to that each of the plurality of first dimensions does not include the corresponding first summary identifier.

Similarly, there may be one or a plurality of second dimensions, which is not limited in the embodiments of this disclosure. In a case that there are a plurality of second dimensions, the data type corresponding to the second dimension refers to a data type corresponding to each of the plurality of second dimensions, and data types corresponding to different second dimensions may be the same or may be different. The second summary identifier corresponding to the second dimension refers to a summary identifier corresponding to each of the plurality of second dimensions determined based on the data type corresponding to each of the plurality of second dimensions. A case that the second dimension includes the second summary identifier refers to that each of the plurality of second dimensions includes the corresponding second summary identifier.

Step 3: Use a union of a model related column corresponding to the dimension query statement, a model related column corresponding to the measure query statement, a model related column corresponding to the filter condition query statement, and a model related column corresponding to the dimension constraint query statement as a target model related column; and determine a model related column query statement based on an expression of the target model related column.

The model related column refers to a column in the target data model, the model related column corresponding to the dimension query statement refers to a dimension column in a target data model related to the dimension query statement, the model related column corresponding to the measure query statement refers to a measure column in a target data model related to the measure query statement, the model related column corresponding to the filter condition query statement refers to a dimension column in a target data model related to the filter condition query statement, and the model related column corresponding to the dimension constraint query statement refers to a dimension column in a target data model related to the dimension constraint query statement.

A union of the model related column corresponding to the dimension query statement, the model related column corresponding to the measure query statement, the model related column corresponding to the filter condition query statement, and the model related column corresponding to the dimension constraint query statement is used as the target model related column. The target model related column refers to a column related to the data query request in the target data model. After the target model related column is determined, a model related column query statement is determined based on an expression of the target model related column. In an exemplary embodiment, the expression of the target model related column is obtained from the metadata table generated according to the format indicated by Table 2 in the target metadata.

In a possible implementation, a manner for determining a model related column query statement based on an expression of the target model related column is: connecting the expression of the target model related column and a column name of the target model related column by specifying a keyword, to obtain the model related column query statement.

Step 4: Determine the target structured query statement based on the dimension query statement, the measure query statement, the filter condition query statement, the physical table query statement, the dimension constraint query statement, and the model related column query statement.

After the dimension query statement, the measure query statement, the filter condition query statement, the physical table query statement, the dimension constraint query statement, and the model related column query statement are obtained, filling is performed according to the composition structure of the target structured query statement, to obtain the target structured query statement.

The foregoing step 1 to step 4 are only described by using an example in which the target physical table is a pre-aggregated table, and the data query request carries a to-be-queried dimension, a to-be-queried measure, and filter condition information. For a case that the data query request does not carry a to-be-queried dimension, the dimension query statement is set to be a specified statement; and for a case that the data query request does not carry filter condition information, the filter condition query statement is set to be a specified statement. The specified statement is set according to experience, and for example, the specified statement is "1=1".

In an exemplary embodiment, the target physical table may alternatively be a basic table. In a case that the target physical table is a basic table, the composition structure of the target structured query statement remains unchanged. That is, the target structured query statement is still determined based on the dimension query statement, the measure query statement, the filter condition query statement, the physical table query statement, the dimension constraint query statement, and the model related column query statement. In a case that the target physical table is a basic table, a manner for determining the dimension query statement, the measure query statement, the filter condition query statement, the physical table query statement, and the model related column query statement is the same as the determining manner in a case that the target physical table is a pre-aggregated table. Because a subtable of a basic table is the basic table, a dimension constraint is not required, the dimension constraint query statement is set to be a specified statement, and for example, the dimension constraint query statement is set to be "1=1".

For example, a ClickHouse (a column-type database management system used for OLAP) database is used as an example, and a composition structure of a structured query statement supported by the ClickHouse database is as follows.

```
WITH
    ${Related_Column_Expression_Alias}
SELECT
    ${Select_Dim_List},
    ${Selected_Measure}
FROM ${Table}
WHERE 1 = 1
    AND ${Filter}
    AND ${Sub_Table_Dims_Desc}
GROUP BY
    ${Selected_Dim_List}
```

In the foregoing composition structure, WITH, SELECT, FROM, WHERE, AND, and GROUP BY are all keywords in the SQL, and WHERE 1=1 is a condition logic determination expression in the SQL. ${Related_Column_Expression_Alias} represents a model related column query statement; ${Select_Dim_List} represents a dimension query statement; ${Selected_Measure} represents a measure query statement; ${Table} represents a physical table query statement; ${Filter} represents a filter condition query statement; and {Sub_Table_Dims_Desc} represents a dimension constraint query statement. As can be seen from the foregoing composition structure, in a process of generating the target structured query statement, the following 7 parts need to be filled.

${Selected_Dim_List} after the keyword SELECT is determined according to a dimension list selected by the user, namely, is determined according to the to-be-queried dimension.

${Selected_Measure} is determined according to a measure selected by the user, namely, is determined according to the to-be-queried measure.

${Table} is determined according to a table identifier of a most suitable query stable that is found, namely, is determined according to a table identifier of the target physical table.

${Filter} is determined according to the filter condition information carried in the data query request. In a case that no filter condition information is carried, this part may be set to be "1=1".

${Sub_Table_Dims_Desc} is used for indicating description of a dimension constraint on the subtable and is equivalent to a summary representation of the subtable; and if the target physical table indicated by ${Table} is a basic table, this part may be set to be "1=1".

${Selected_Dim_List} after the keyword GROUP BY is totally consistent with ${Selected_Dim_List} after the keyword SELECT. If an expression of a measure indicated by ${Selected_Measure} does not carry an aggregation function, this part may be set to be "1=1". For example, the expression corresponding to the measure indicated by ${Selected_Measure} is obtained from the metadata table generated according to the format indicated by Table 2 in the target metadata.

${Related_Column_Expression_Alias} is used for indicating a column name of a model related column; The related column refers to a union of related columns of models related to ${Selected_Dim_List}, ${Selected_Measure}, ${Filter}, and ${Sub_Table_Dims_Desc}, namely, the target model related column. For example, in the metadata table generated according to the format indicated by Table 2 in the target metadata, the expression corresponding to the target model related column in the target physical table indicated by ${Table} is found, and the expression is connected to a column alias through an SQL keyword "AS"

to obtain ${Related_Column_Expression_Alias}. The column alias uses column_name.

In an exemplary embodiment, an example in which the data query request is represented by using a logic SQL, data in the logic SQL is data in a JSON format, and the target structured query statement is a physical SQL is used, proper processing needs to be performed when the JSON data in the logic SQL is converted into the physical SQL. For example, it is assumed that the filter condition information in the logic SQL is represented in the following JSON format.

```
{
  "AND_OR": "AND",
  "Filter_list": [
  "user_age BETWEEN 20 AND 30"
  "date_id = 20200701"
  ]
}
```

In this case, when the filter condition query statement ${Filter} is obtained, the filter condition information in the foregoing format needs to be processed into "user_age BETWEEN 20 AND 30 AND date_id=20200701".

After the target structured query statement is obtained, the target structured query statement is executed in a database storing the target physical table, to obtain the target query data corresponding to the data query request. For example, when the target query data obtained by the server is a data set object, after the target query data is obtained, the server converts the data set object into a JSON format through parsing and then returns the target query data in the JSON format to the terminal transmitting the data query request. The terminal converts the target query data in the JSON format into a table or a graph that is easy to read by the user and then displays the table or graph to the user.

For example, for the user, operations of the server are hidden to the user, after the user selects a measure, a dimension, and a filter condition and clicks a "query" button, the server performs the data query method provided in the embodiments of this disclosure and returns the queried target query data to the terminal, and the terminal displays the target query data. For example, as shown by 302 in FIG. 3, the terminal displays the target query data in the form of a table. In the embodiments of this disclosure, the process of executing the target structured query statement in the database storing the target physical table is not limited. According to different data included in the target physical table and different content of the target structured query statement, the process of executing the target structured query statement may also differ, and time consumed for obtaining the target query data by executing the target structured query statement may also differ.

Figure 4:
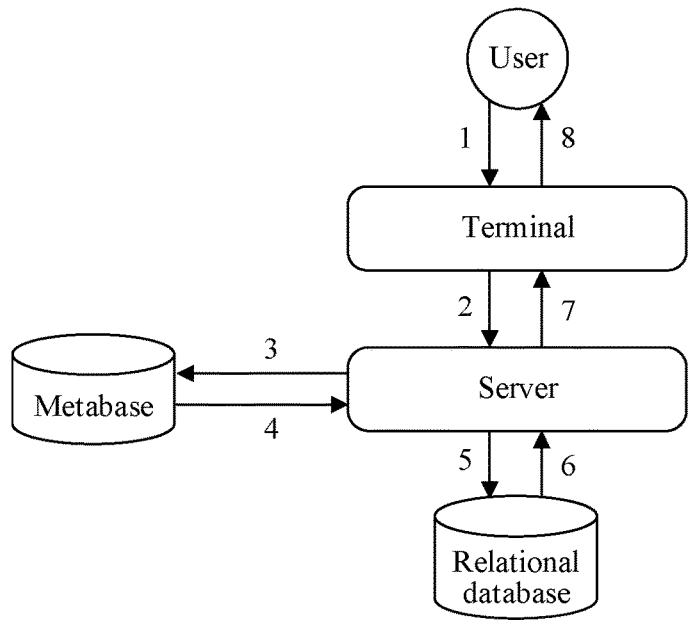
FIG. 4 is a schematic diagram of a data query process according to an embodiment of this disclosure.

In an exemplary embodiment, a data query process is shown in FIG. 4. 1. The user logs in to a terminal and selects a dimension, a measure, and a filter condition that are required. For example, the terminal in the embodiments of this disclosure refers to a web frontend of the data query platform. 2. The terminal submits the dimension, the measure, and the filter condition selected by the user to the server in the form of a logic SQL (that is, the data query request). For example, the server in the embodiments of this disclosure refers to an ROLAP engine. 3. After receiving the logic SQL, the server determines a metabase configured to store metadata. 4. The server obtains required target metadata from the metabase. 5. The server determines the target physical table according to the target metadata, converts the logic SQL into a physical SQL (that is, the target structured query statement), and determines a relational database configured to store the target physical table. 6. The server executes the physical SQL in the relational database to obtain the target query data. 7. The server converts the obtained target query data into data in a JSON format and returns the data to the terminal. 8. The terminal displays the data in the JSON format to the user in the form of a table or a graph.

The data query method provided in the embodiments of this disclosure may be considered as an implementation solution of an ROLAP engine in an application scenario of a data query platform. After the ROLAP engine receives a data query request, the ROLAP engine may perform smart search in a database to find a most suitable target physical table of the current data query request, then perform query processing, and finally return target query data.

In the embodiments of this disclosure, a manner of a basic table and a pre-aggregated table is designed, so that the user may autonomously determine to perform pre-aggregation of one dimension combination according to an actual use requirement instead of any combination of a plurality of dimensions. In this way, the actual requirement can be met and data explosion may not be caused. In addition, the embodiments of this disclosure design a logic SQL query method. The logic SQL is similar to a physical SQL in a database, and the logic SQL is easy to use, has strong readability, and is easy to develop and spread in engineering. In addition to facilitating program parsing, the logic SQL can also be easily converted from a JSON format to an SQL format, thereby greatly improving the readability and facilitating analysis.

Further, the data storage method of the pre-aggregated table provided in the embodiments of this disclosure has the following advantages: first, the method facilitates the user to store data of a plurality of granularities in one table. Second, in the embodiments of this disclosure, the pre-aggregated table is classified into cube, rollup, and groupingsets types, which are in a one-by-one correspondence with summary keywords in a Hive or Spark (a big data parallel calculation framework based on memory calculation) SQL. In this way, data pre-aggregation processing may be performed by using the Hive or Spark SQL, so that the advantage of Hive or Spark cluster parallel calculation is fully utilized, and the pre-aggregation calculation becomes convenient and efficient. Third, during pre-aggregation calculation, dimensions selected from a plurality of dimensions for combination calculation can be autonomously determined according to a requirement, and the dimensions are not randomly combined, thereby greatly reducing a calculation amount and a storage amount of data pre-aggregation. Fourth, tables are stored in a manner of carrying dimension information instead of only storing a dimension primary key. Therefore, during querying, association between dimension tables and fact tables is not involved, thereby greatly improving a query response speed.

In this embodiments of this disclosure, a data query implementation process depends on the at least two physical tables corresponding to the target data model, and the at least two physical tables corresponding to the target data model include a basic table and a pre-aggregated table after pre-aggregation calculation is performed according to a requirement. That is, physical tables used for implementing data query may be obtained without performing pre-aggregation calculation according to all combinations of dimensions, so that a pre-aggregation calculation amount is relatively small. In addition, data of at least two granularities is recorded through one pre-aggregated table, so that the number of tables stored in a database can be effectively reduced, and a data storage amount is reduced, which is conducive to improve a data query response speed.

In the embodiments of this disclosure, a data query instance is provided for ease of understanding a specific implementation process of data query. For example, the data query process mentioned in the embodiments of this disclosure refers to an implementation process of ROLAP, the data query process is implemented through an ROLAP engine, and the ROLAP engine may be considered as a server.

The data query instance provided in the embodiments of this disclosure is implemented in such an analysis requirement: a data analyst of an information application (APP) needs to perform data analysis according to dimensions and measures shown in Table 14, and in addition to requiring a query speed to be as fast as possible, the data analyst hopes that the ROLAP engine can provide dimension combination results for the measures as much as possible.

TABLE 14

| Column type | Column name | Data type | Meaning |
|---|---|---|---|
| Dimension | date_id | int | Date |
| | user_id | string | User ID |
| | user_sex | string | User sex |
| | user_age | int | User age |
| | article_id | string | Article ID |
| | article_type | string | Article type |
| | article_category | string | Article category |
| | article_source | string | Article source |
| Measure | pv | int | Article click pv |
| | uv | int | Article click uv |
| | pv_avg | float | Average click pv |

In Table 14, in the data type column, int represents an integral type, string represents a character string type, and float represents a float type. In the meaning column, pv refers to a page view, and uv refers to a unique visitor.

In an exemplary embodiment, the developer designs 6 physical tables by using the ROLAP storage solution provided in the embodiments of this disclosure, which are stored in an RDB (for example, ClickHouse). The 6 physical tables are respectively shown in Table 15 to Table 20.

TABLE 15

(table type: group)

| Primary key | Column name | Data type | Meaning |
|---|---|---|---|
| * | date_id | int | Date |
| * | user_id | string | User ID |
| | user_sex | string | User sex |
| | user_age | int | User age |
| * | article_id | string | Article ID |
| | article_type | string | Article type |
| | article_category | string | Article category |
| | article_source | string | Article source |
| | pv | int | Article click pv |

TABLE 16

(table type: group)

| Primary key | Column name | Data type | Meaning |
|---|---|---|---|
| * | date_id | int | Date |
| * | user_sex | string | User sex |
| * | user_age | int | User age |
| * | article_type | string | Article type |
| * | article_category | string | Article category |
| | pv | int | Article click pv |
| | uv | int | Article click uv |

TABLE 17

(table type: cube)

| Pre-aggregation dimension | Column name | Data type | Meaning |
|---|---|---|---|
| | date_id | int | Date |
| | user_sex | string | User sex |
| * | user_age | int | User age |
| * | article_type | string | Article type |
| * | article_category | string | Article category |
| | pv | int | Article click pv |
| | uv | int | Article click uv |

TABLE 18

(table type: rollup)

| Pre-aggregation dimension | Column name | Data type | Meaning |
|---|---|---|---|
| | date_id | int | Date |
| | user_sex | string | User sex |
| | user_age | int | User age |
| * | article_type | string | Article type |
| * | article_category | string | Article category |
| * | article_source | string | Article source |
| | pv | int | Article click pv |
| | uv | int | Article click uv |

TABLE 19

(table type: groupingsets)

| Pre-aggregation dimension | Column name | Data type | Meaning |
|---|---|---|---|
| | date_id | int | Date |
| | user_sex | string | User sex |
| * | user_age | int | User age |
| * | article_type | string | Article type |
| * | article_category | string | Article category |
| | pv | int | Article click pv |
| | uv | int | Article click uv |

TABLE 20

(table type: cube)

| Pre-aggregation dimension | Column name | Data type | Meaning |
|---|---|---|---|
| | date_id | int | Date |
| * | article_type | string | Article type |
| * | article_category | string | Article category |
| | uv | int | Article click uv |

In Table 15 to Table 20, the table type group is used for identifying a basic table, the table type cube is used for identifying a pre-aggregated table of a first type, the table type rollup is used for identifying a pre-aggregated table of a second type, and the table type groupingsets is used for identifying a pre-aggregated table of a third type. It is assumed that a table name of the physical table shown in Table 15 is t0, a table name of the physical table shown in Table 16 is t1, a table name of the physical table shown in Table 17 is t2, a table name of the physical table shown in Table 18 is t3, a table name of the physical table shown in Table 19 is t4, and a table name of the physical table shown in Table 20 is t5, where t0 and t1 are basic tables, and t2 to t5 are pre-aggregated tables.

In the basic table t0 and the basic table t1, an asterisk (*) is used to identify a primary key, and in the pre-aggregated table t2 to the pre-aggregated table t5, an asterisk (*) is used to identify a pre-aggregation dimension. In different pre-aggregated tables, types and the numbers of pre-aggregation dimensions may be the same or may be different.

As can be seen from Table 15 to Table 20, the physical table shown in Table 15 is a table with a thinnest granularity, all dimensions and measures required by the data analyst are obtained from the table, and the physical table shown in Table 15 can provide a measure query result of any dimension combination. However, if the granularity of the physical table shown in Table 15 is excessively thin, the data amount may be excessively great, and a requirement of query timeliness (for example, in 1 second) cannot be met. Therefore, the developer further designs the physical tables shown in Table 16 to Table 20 to perform pre-aggregation storage on the physical table shown in Table 15. Because the numbers of dimensions involved in the physical tables shown in Table 16 to Table 20 are relatively small, a data granularity is relatively thick, and a data amount is correspondingly reduced, so that the requirement of query timeliness can be met.

Aggregation types of the pre-aggregated table t2 to the pre-aggregated table t5 are respectively cube, rollup, groupingsets, and cube, and the developer can use a Hive platform and use summary keywords (cube/rollup/groupingsets) in a Hive_SQL script to implement pre-aggregation calculation, thereby greatly simplifying development work.

In an exemplary embodiment, after the physical tables shown in Table 15 to Table 20 are designed, the developer can obtain, according to metadata of a physical table filling model, metadata corresponding to the model. In the embodiments of this disclosure, metadata obtained by filling the physical tables shown in Table 15 to Table 20 includes 6 metadata tables, and the 6 metadata tables are respectively shown in Table 21 to Table 26. Table 21 to Table 26 may be considered as the metadata tables generated according to the formats indicated by Table 1 to Table 6 provided in the embodiment shown in FIG. 2 by the physical tables shown in Table 15 to Table 20. For specific meanings of Table 21 to Table 26, reference may be made to Table 1 to Table 6 provided in the embodiment shown in FIG. 2 and Table 14, and details are not described herein again.

TABLE 21

| model_id | column_name | column_type | column_date_type |
|---|---|---|---|
| 123 | date_id | dim | int |
| 123 | user_sex | dim | string |
| 123 | user_age | dim | int |
| 123 | article_type | dim | string |
| 123 | article_catagory | dim | string |
| 123 | article_source | dim | string |
| 123 | uv | measure | int |
| 123 | pv | measure | int |
| 123 | pv_avg | measure | float |

TABLE 22

| model_id | table_name | column_name | column_expression |
|---|---|---|---|
| 123 | t0 | date_id | date_id |
| 123 | t0 | user_sex | user_sex |
| 123 | t0 | user_age | user_age |
| 123 | t0 | article_type | article_type |
| 123 | t0 | article_catagory | article_catagory |
| 123 | t0 | article_source | article_source |
| 123 | t0 | uv | count(distinct_user_id) |
| 123 | t0 | pv | sum(pv) |
| 123 | t0 | pv_avg | sum(pv)/count(distinct_user_id) |
| 123 | t1 | date_id | date_id |
| 123 | t1 | user_sex | user_sex |
| 123 | t1 | user_age | user_age |
| 123 | t1 | article_type | article_type |
| 123 | t1 | article_catagory | article_catagory |
| 123 | t1 | uv | sum(uv) |
| 123 | t1 | pv | sum(pv) |
| 123 | t1 | pv_avg | sum(pv)/sum(uv) |
| 123 | t2 | date_id | date_id |
| 123 | t2 | user_sex | user_sex |
| 123 | t2 | user_age | user_age |
| 123 | t2 | article_type | article_type |
| 123 | t2 | article_catagory | article_catagory |
| 123 | t2 | uv | sum(uv) |
| 123 | t2 | pv | sum(pv) |
| 123 | t2 | pv_avg | sum(pv)/sum(uv) |
| 123 | t5 | date_id | date_id |
| 123 | t5 | article_type | article_type |
| 123 | t5 | article_catagory | article_catagory |
| 123 | t5 | uv | uv |

Due to a space limitation, in Table 22, content related to physical tables whose table names are t3 and t4 is omitted.

TABLE 23

| model_id | table_name | measure | aggr_dims | non_aggr_dims |
|---|---|---|---|---|
| 123 | t0 | uv | date_id, user_id, user_sex, user_age, article_id, article_type, article_catagory, article_source | |
| 123 | t0 | pv | date_id, user_id, user_sex, user_age, article_id, article_type, article_catagory, article_source | |
| 123 | t0 | pv_avg | date_id, user_id, user_sex, user_age, article_id, article_type, article_catagory, article_source | |
| 123 | t1 | uv | user_sex, user_age | date_id, article_type, article_catagory |
| 123 | t1 | pv | date_id, user_sex, user_age, article_type, article_catagory | |
| 123 | t1 | pv_avg | user_sex, user_age | date_id, article_type, article_catagory |
| 123 | t2 | uv | user_sex, user_age | date_id, article_type, article_catagory |
| 123 | t2 | pv | date_id, user_sex, user_age, article_type, article_catagory | |
| 123 | t2 | pv_avg | user_sex, user_age | date_id, article_type, article_catagory |
| 123 | t3 | uv | user_sex, user_age | date_id, article_type, article_catagory, article_source |
| 123 | t3 | pv | date_id, user_sex, user_age, article_type, article_catagory, article_source | |
| 123 | t3 | pv_avg | user_sex, user_age | date_id, article_type, article_catagory, article_source |
| 123 | t4 | uv | user_sex, user_age | date_id, article_type, article_catagory |
| 123 | t4 | pv | date_id, user_sex, user_age, article_type, article_catagory | |
| 123 | t4 | pv_avg | user_sex, user_age | date_id, article_type, article_catagory |
| 123 | t5 | uv | | date_id, article_type, article_catagory |

TABLE 24

| model_id | table_name | table_type | comb_dims | other_dims |
|---|---|---|---|---|
| 123 | t0 | group | | date_id, user_id, user_sex, user_age, article_id, article_type, article_catagory, article_source |
| 123 | t1 | group | | date_id, user_sex, user_age, article_type, article_catagory |
| 123 | t2 | cube | user_age, article_type, article_catagory | date_id, user_sex |
| 123 | t3 | rollup | article_type, article_catagory, article_source | date_id, user_sex, user_age |
| 123 | t4 | groupingset | user_age, article_type, article_catagory | date_id, user_sex |
| 123 | t5 | cube | article_type, article_catagory | date_id |

TABLE 25

| model_id | table_name | sub_table_comb_subset | sub_table_all_dims | sub_table_dims_cnt |
|---|---|---|---|---|
| 123 | t0 | | date_id, user_id, user_sex, user_age, article_id, article_type, article_catagory, article_source | 8 |
| 123 | t1 | | date_id, user_sex, user_age, article_type, article_catagory | 5 |
| 123 | t2 | | date_id, user_sex | 2 |
| 123 | t2 | user_age | date_id, user_sex, user_age | 3 |
| 123 | t2 | article_type | date_id, user_sex, article_type | 3 |
| 123 | t2 | article_catagory | date_id, article_type, article_catagory | 3 |
| 123 | t2 | user_age, article_type | date_id, user_sex, user_age, article_type | 4 |
| 123 | t2 | user_age, article_catagory | date_id, user_sex, user_age, article_catagory | 4 |
| 123 | t2 | article_type, article_catagory | date_id, user_sex, article_type, article_catagory | 4 |
| 123 | t2 | user_age, article_type, article_catagory | date_id, user_sex, user_age, article_type, article_catagory | 5 |
| 123 | t3 | | date_id, user_sex, user_age | 3 |
| 123 | t3 | article_type | date_id, user_sex, user_age, article_type | 4 |
| 123 | t3 | article_type, article_catagory | date_id, user_sex, user_age, article_type, article_catagory | 5 |
| 123 | t3 | article_type, article_catagory, article_source | date_id, user_sex, user_age, article_type, article_catagory, article_source | 6 |
| 123 | t4 | user_age | date_id, user_sex, user_age | 3 |
| 123 | t4 | article_type | date_id, user_sex, article_type | 3 |
| 123 | t4 | article_catagory | date_id, user_sex, article_catagory | 3 |
| 123 | t5 | | date_id | 1 |
| 123 | t5 | article_type | date_id, article_type | 2 |
| 123 | t5 | article_catagory | date_id, article_catagory | 2 |
| 123 | t5 | article_type, article_catagory | date_id, user_sex, article_catagory | 3 |

TABLE 26

| model_id | table_name | sub_table_comb_subset | measure | non_aggr_dims |
|---|---|---|---|---|
| 123 | t0 | | pv | |
| 123 | t0 | | uv | |
| 123 | t0 | | pv_avg | |
| 123 | t1 | | pv | |
| 123 | t1 | | uv | date_id, article_type, article_catagory |
| 123 | t1 | | pv_avg | date_id, article_type, article_catagory |
| 123 | t2 | | pv | |
| 123 | t2 | user_age | pv | |
| 123 | t2 | article_type | pv | |
| 123 | t2 | article_catagory | pv | |
| 123 | t2 | user_age, article_type | pv | |
| 123 | t2 | user_age, article_catagory | pv | |
| 123 | t2 | article_type, article_catagory | pv | |
| 123 | t2 | user_age, article_type, article_catagory | pv | |
| 123 | t2 | | uv | date_id |
| 123 | t2 | user_age | uv | date_id |
| 123 | t2 | article_type | uv | date_id, article_type |
| 123 | t2 | article_catagory | uv | date_id, article_catagory |
| 123 | t2 | user_age, article_type | uv | date_id, article_type |
| 123 | t2 | user_age, article_catagory | uv | date_id, article_catagory |
| 123 | t2 | article_type, article_catagory | uv | date_id, article_type, article_catagory |
| 123 | t2 | user_age, article_type, article_catagory | uv | date_id, article_type, article_catagory |
| 123 | t2 | | pv_avg | date_id |
| 123 | t2 | user_age | pv_avg | date_id |
| 123 | t2 | article_type | pv_avg | date_id, article_type |

TABLE 26-continued

| model_id | table_name | sub_table_comb_subset | measure | non_aggr_dims |
|---|---|---|---|---|
| 123 | t2 | article_catagory | pv_avg | date_id, article_catagory |
| 123 | t2 | user_age, article_type | pv_avg | date_id, article_type |
| 123 | t2 | user_age, article_catagory | pv_avg | date_id, article_catagory |
| 123 | t2 | article_type, article_catagory | pv_avg | date_id, article_type, article_catagory |
| 123 | t2 | user_age, article_type, article_catagory | pv_avg | date_id, article_type, article_catagory |

Due to a space limitation, in Table 26, content related to physical tables whose table names are t3, t4, and t5 is omitted.

When metadata of a model is obtained, detailed description of the model is obtained. After the query request of the user is received, an ROLAP service may be provided through the metadata, namely, a data query service may be provided.

For example, an instance of the data query request in the embodiments of this disclosure is as follows.

```
{
  "SELECT": {
    "Selected_Dim_List": ["user_age", "article_category"],
    "Selected_Measure": "pv_avg"
  },
  "FROM": "123",
  "WHERE":{
    "AND_OR": "AND",
    "Filter List": ["user_age BETWEEN 20 AND 30", "date_id = 20200701"]
  }
}
```

The ROLAP service provided in the embodiments of this disclosure may be divided into three stages. In the first stage, a target physical table is determined, namely, a physical table from which data is queried is determined. In the second stage, a target structured query statement is generated, namely, an SQL query statement used for database query is generated. In the third stage, the target structured query statement is executed and a result is returned, namely, the target structured query statement is executed and target query data is returned.

In the first stage, the target physical table is determined.

This stage is most important since this stage is a key for ROLAP to improve a response speed. Through the following 4 steps, a target physical table with a highest query speed can be found from a plurality of physical tables.

1-1: Determine a logic dimension set.

As can be known from the foregoing data query request, the logic dimension set is ${Colunmn_Set}={user_age, article_category, date_id}.

1-2: Obtain a first query result.

An example that a query condition determined based on ${Model_ID}=123 and ${Selected_Measure}=pv_avg is represented by using the following SQL query statement is used.

```
SELECT
  m5.table_name,
  m5.sub_table_comb_subset,
  m5.sub_table_all_dims,
  m6.non_aggr_dims
FROM m5
JOIN m6
ON m5.model_id = m6.model_id
  AND m5.table_name = m6.table_name
  AND m5.sub_table_comb_subset = m6.sub_table_comb_subset
WHERE m5.model_id = 123
  AND m6.measure = pv_avg
ORDER BY m5.sub_table_dims_cnt ASC
```

In the embodiments of this disclosure, m5 refers to the metadata table shown in Table 25, and m6 refers to the metadata table shown in Table 26. According to the query request, query is performed in the metadata table shown in Table 25 and the metadata table shown in Table 26, and an obtained first query result Row_set_1 is shown in Table 27.

TABLE 27

| # | table_name | sub_table_comb_subset | sub_table_all_dims | non_aggr_dims |
|---|---|---|---|---|
| 1 | t2 | | date_id, user_sex | date_id |
| 2 | t2 | user_age | date_id, user_sex, user_age | date_id |
| 3 | t2 | article_type | date_id, user_sex, article_type | date_id, article_type |
| 4 | t2 | article_category | date_id, user_sex, article_category | date_id, article_category |
| 5 | t2 | user_age, article_type | date_id, user_sex, user_age, article_type | date_id, article_type |
| 6 | t2 | user_age, article_category | date_id, user_sex, user_age, article_category | date_id, article_category |
| 7 | t2 | article_type, article_category | date_id, user_sex, article_type, article_category | date_id, article_type, article_category |
| 8 | t1 | | date_id, user_sex, user_age, article_type, article_category | date_id, article_type, article_category |

TABLE 27-continued

| # | table_name | sub_table_comb_subset | sub_table_all_dims | non_aggr_dims |
|---|---|---|---|---|
| 9 | t2 | user_age, article_type, article_category | date_id, user_sex, user_age, article_type, article_category | date_id, article_type, article_category |
| 10 | t0 |  | date_id, user_id, user_sex, user_age, article_id, article_type, article_category, article_source |  |

Table 27 includes 10 rows of data whose row serial numbers are 1 to 10, and each row of data corresponds to one query subresult, and the 10 rows of data whose row serial numbers are 1 to 10 is arranged in ascending order according to the number of matching dimensions.

1-3: Filter the first query result obtain a second query result.

A process of filtering the first query result includes the following steps 1-3a and 1-3b.

1-3a: Perform filtering based on matching dimensions.

TABLE 28

| # | table_name | sub_table_comb_subset | sub_table_all_dims | non_aggr_dims |
|---|---|---|---|---|
| 6 | t2 | user_age, article_category | date_id, user_sex, user_age, article_category | date_id, article_category |
| 8 | t1 |  | date_id, user_sex, user_age, article_type, article_category | date_id, article_type, article_category |
| 9 | t2 | user_age, article_type, article_category | date_id, user_sex, user_age, article_type, article_category | date_id, article_type, article_category |
| 10 | t0 |  | date_id, user_id, user_sex, user_age, article_id, article_type, article_category, article_source |  |

For the logic dimension set ${Column_Set}={user_age, article_category, date_id}, matching dimensions are data in the sub_table_all_dims column in Table 27. As can be known from Table 27, matching dimensions corresponding to rows whose row serial numbers are 1 and 3 do not include the user_age and the article_category in the logic dimension set, matching dimensions corresponding to rows whose row serial numbers are 4 and 7 do not include the user_age in the logic dimension set, and matching dimensions corresponding to rows whose row serial numbers are 2 and 5 do not include the article_category in the logic dimension set. Therefore, the rows whose row serial numbers are 1, 2, 3, 4, 5, and 7 are deleted from Table 27, and an obtained reference query result Rows_Set_2 is shown in Table 28.

1-3b: Perform filtering based on non-aggregatable dimensions.

The non-aggregatable dimensions are data in the non_aggr_dims column in Table 28. Because article_type in non-aggregatable dimensions corresponding to rows whose row serial numbers are 8 and 9 in Table 28 does not appear in ${Select_Dim_List} and also does not belong to a dimension corresponding to a single filter condition in ${Filter}, the rows whose row serial numbers are 8 and 9 are deleted from Table 28, and a finally obtained second query result Rows_Set_3 is shown in Table 29.

TABLE 29

| # | table_name | sub_table_comb_subset | sub_table_all_dims | non_aggr_dims |
|---|---|---|---|---|
| 6 | t2 | user_age, article_category | date_id, user_sex, user_age, article_category | date_id, article_category |
| 10 | t0 |  | date_id, user_id, user_sex, user_age, article_id, article_type, article_category, article_source |  |

In the process of filtering the first query result, a row sequence remains unchanged, and a row serial number corresponding to each row remains unchanged.

1-4: Determine a target physical table.

A table identifier in the first row of data in the second query result Rows_Set_3 is t2, and the physical table t2 is determined as the target physical table.

In the second stage, the target structured query statement is generated.

The following content 1 to content 7 can be determined according to the data query request instance and the determined physical table t2.

Content 1: The dimension query statement ${Selected_Dim_List} after the keyword SELECT is represented as {user_age, article_category}.

Content 2: The measure query statement ${Selected_Measure} is represented as pv_avg.

Content 3: The physical table query statement ${Table} is represented as t2.

Content 4: The filter condition query statement ${Filter} is represented as user_age BETWEEN 20 AND 30 AND date_id=20200701.

Content 5: For the dimension constraint query statement ${Sub_Table_Dims_Desc}:

A target dimension combination subset sub_table_comb_subset corresponding to a first row in the Rows_Set_3 is {user_age, article_category}. As can be known from the metadata table shown in Table 24, the at least one pre-aggregation dimension comb_dims corresponding to the physical table t2 is {user_age, article_type, article_category}. As can be known from the metadata table shown in Table 21, a data type corresponding to the user_age dimension is int, so that a summary identifier corresponding to the user_age dimension is 99999999; and data types corresponding to the article_type dimension and the article_category dimension are both string, so that summary identifiers corresponding to the article_type dimension and the article_category dimension are both TOTAL. Therefore, the dimension constraint query statement ${Sub_Table_Dims_Desc} is represented as user_age !=99999999 AND article_category !='TOTAL' AND article_type='TOTAL'.

Content 6: For the dimension query statement ${Selected_Dim_List} after the keyword GROUP BY:

As can be known from the metadata table shown in Table 22, an expression of the pv_avg in the physical table t2 is "sum(pv)/sum(uv)", which carries an aggregation function sum, so that this part cannot be omitted. That is, the dimension query statement ${Selected_Dim_List} after the keyword GROUP BY is represented as {user_age, article_category}.

Content 7: For the model related column query statement ${Related_Column_Expression_Alias}:

The model related column corresponding to the dimension query statement ${Selected_Dim_List} is {user_age, article_category}, the model related column corresponding to the measure query statement ${Selected_Measure} is {pv_avg}, the model related column corresponding to the filter condition query statement ${Filter} is {user_age, date_id}, and the model related column corresponding to the dimension constraint query statement ${Sub_Table_Dims_Desc} is {user_age, article_category, article_type}. Therefore, the target model related column is {date_id, article_category, article_type, user_age, pv_avg}.

An expression of the target model related column in the physical table t2 may be determined by querying the metadata table shown in Table 22, and the model related column query statement ${Related_Column_Expression_Alias} is further determined as follows.

```
date_id As date_id,
article_category As article_category,
article_type As article_type,
user_age As user_age,
sum(pv)/sum(uv) As pv_avg
```

Content before the keyword AS represents the expression of the target model related column, and content after the keyword AS represents a column_name of the target model related column.

The target structured query statement finally obtained by determining the foregoing content 1 to content 7 is shown in FIG. 5 (for ease of reading, proper line feeding and indentation processing are manually performed).

In the third stage, the target structured query statement is executed.

The target structured query statement is executed in a database (for example, a ClickHouse database) storing the physical table t2 to obtain the target query data. The ROLAP engine converts the target query data into a JSON format and returns the data to the terminal. For example, a part of the target query data in the JSON format is shown as follows:

```
[
    {
        "user_age": "20",
        "article_category": "Social",
        "pv_avg": "52.28389461"
    },
    {
        "user_age": "20",
        "article_category": "Finance"
        "pv_avg": "39.32462943"
    },
    {
        "user_age": "20",
        "article_category": "Sports",
        "pv_avg": "34.68875882"
    },
]
```

After the target query data in the JSON format is returned to the terminal, the terminal converts the target query data in the JSON format into a table or a graph that is easy to read by the user to the user, and the entire data query process is completed at this point.

Referring to FIG. 6, an embodiment of this disclosure provides a data query apparatus. The apparatus includes a first obtaining unit 601, a first obtaining unit 601, a determining unit 602, and a second obtaining unit 603. One or more modules, submodules, and/or units of the apparatus can be implemented by processing circuitry, software, or a combination thereof, for example.

The first obtaining unit 601 is configured to obtain a data query request for a target data model.

The determining unit 602 is configured to determine, based on the data query request and target metadata corresponding to the target data model, a target physical table corresponding to the data query request from at least two physical tables corresponding to the target data model, the target metadata being determined based on the at least two physical tables, the at least two physical tables including a basic table and a pre-aggregated table obtained after pre-aggregation calculation is performed according to a requirement, the basic table being used for recording basic data, and one pre-aggregated table being used for recording data of at least two granularities.

The second obtaining unit 603 is configured to obtain target query data corresponding to the data query request based on the data query request and the target physical table.

In a possible implementation, the data query request carries a to-be-queried measure; and the determining unit 602 is configured to determine a logic dimension set corresponding to the data query request; determine a query condition based on a model identifier of the target data model and the to-be-queried measure; query a first query result matching the query condition from the target metadata, where the first query result includes at least one query subresult, and one query subresult includes a table identifier of one physical table corresponding to the target data model; filter the first query result based on the logic dimension set to obtain a second query result, and use a query subresult meeting a selection condition in the second query result as a target query subresult; and determine a physical table indicated by a table identifier included in the target query subresult as the target physical table corresponding to the data query request.

In a possible implementation, the determining unit 602 is further configured to form, in response to that the data query request further carries a to-be-queried dimension, the logic dimension set corresponding to the data query request through the to-be-queried dimension; determine, in response to that the data query request further carries filter condition information, a reference dimension corresponding to the filter condition information, and form the logic dimension set corresponding to the data query request through the reference dimension; determine, in response to that the data query request further carries a to-be-queried dimension and filter condition information, a reference dimension corresponding to the filter condition information, and use a union of the to-be-queried dimension and the reference dimension as the logic dimension set corresponding to the data query request; and use, in response to that the data query request does not carry a to-be-queried dimension and filter condition information, an empty set as the logic dimension set corresponding to the data query request.

In a possible implementation, the data query request further carries a to-be-queried dimension and filter condition information, and one query subresult further includes matching dimensions and non-aggregatable dimensions; and the determining unit 602 is further configured to delete a query subresult including matching dimensions not meeting a first condition from the first query result to obtain a reference query result, where the not meeting a first condition is used for indicating that the included matching dimensions do not include all dimensions in the logic dimension set; and delete a query subresult including non-aggregatable dimensions not meeting a second condition from the reference query result to obtain a second query result, where the not meeting a second condition is used for indicating that the included non-aggregatable dimensions include a non-aggregatable dimension that does not belong to the to-be-queried dimension and also does not belong to a dimension corresponding to a single filter condition indicated by the filter condition information.

In a possible implementation, the at least one query subresult in the first query result is arranged in ascending order of the number of matching dimensions or arranged in descending order of the number of matching dimensions; an arrangement sequence of query subresults in the second query result is the same as an arrangement sequence of corresponding query subresults in the first query result; and the determining unit 602 is further configured to use, in response to that the at least one query subresult in the first query result is arranged in ascending order of the number of matching dimensions, a query subresult ranked first in the second query result as the target query subresult; and use, in response to that the at least one query subresult in the first query result is arranged in descending order of the number of matching dimensions, a query subresult ranked last in the second query result as the target query subresult.

In a possible implementation, the second obtaining unit 603 is configured to determine a target structured query statement based on the data query request and the target physical table; and execute the target structured query statement in a database storing the target physical table, to obtain the target query data corresponding to the data query request.

In a possible implementation, the target physical table is a pre-aggregated table; the data query request carries a to-be-queried dimension, a to-be-queried measure, and filter condition information; the target physical table is a physical table indicated by the table identifier included in the target query subresult, and the target query subresult further includes a target dimension combination subset; and the second obtaining unit 603 is further configured to determine a dimension query statement based on the to-be-queried dimension; determine a measure query statement based on the to-be-queried measure; determine a filter condition query statement based on the filter condition information; determine a physical table query statement based on the table identifier of the target physical table; determine a dimension constraint query statement based on the target dimension combination subset and at least one target pre-aggregation dimension corresponding to the target physical table; use a union of a model related column corresponding to the dimension query statement, a model related column corresponding to the measure query statement, a model related column corresponding to the filter condition query statement, and a model related column corresponding to the dimension constraint query statement as a target model related column; determine a model related column query statement based on an expression of the target model related column; and determine the target structured query statement based on the dimension query statement, the measure query statement, the filter condition query statement, the physical table query statement, the dimension constraint query statement, and the model related column query statement.

In a possible implementation, the target dimension combination subset is one reference dimension combination subset in at least one reference dimension combination subset determined based on the at least one target pre-aggregation dimension; and the second obtaining unit 603 is further configured to use a dimension in the target dimension combination subset as a first dimension, and determine a first summary identifier corresponding to the first dimension; determine a second summary identifier corresponding to a second dimension, where the second dimension is a dimension other than the first dimension in the at least one target pre-aggregation dimension; and use a query statement used for indicating that the first dimension does not include the first summary identifier and the second dimension includes the second summary identifier as the dimension constraint query statement.

In a possible implementation, the target physical table is a pre-aggregated table of a first type, and the at least one reference dimension combination subset is obtained by performing random combination on the at least one target pre-aggregation dimension; or the target physical table is a pre-aggregated table of a second type, and the at least one reference dimension combination subset is obtained by performing layered combination on the at least one target pre-aggregation dimension; or the target physical table is a pre-aggregated table of a third type, and the at least one reference dimension combination subset is obtained by performing separate combination on the at least one target pre-aggregation dimension.

In a possible implementation, the number of granularities of data recorded in the target physical table is the same as the number of the at least one reference dimension combination subset.

Figure 7:
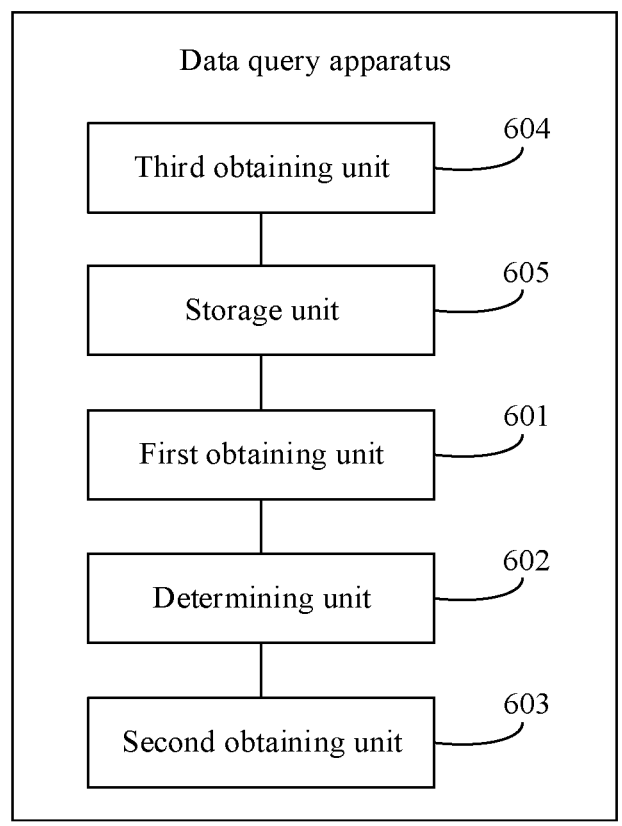
FIG. 7 is a schematic diagram of a data query apparatus according to an embodiment of this disclosure.

In a possible implementation, referring to FIG. 7, the apparatus further includes a third obtaining unit 604 and a storage unit 605.

The third obtaining unit 604 is configured to obtain the at least two physical tables corresponding to the target data model; and determine the target metadata corresponding to the target data model based on the at least two physical tables.

The storage unit 605 is configured to store the at least two physical tables and the target metadata.

In this embodiments of this disclosure, a data query implementation process depends on the at least two physical tables corresponding to the target data model, and the at least two physical tables corresponding to the target data model include a basic table and a pre-aggregated table after pre-aggregation calculation is performed according to a requirement. That is, physical tables used for implementing data query may be obtained without performing pre-aggregation calculation according to all combinations of dimensions, so that a pre-aggregation calculation amount is relatively small. In addition, data of at least two granularities is recorded through one pre-aggregated table, so that the number of tables stored in a database can be effectively reduced, and a data storage amount is reduced, which is conducive to improve a data query response speed.

The apparatus provided in the foregoing embodiments implements functions of the apparatus, the division of the foregoing functional units is merely an example for description. In the practical application, the functions may be assigned to and completed by different functional units according to the requirements, that is, the internal structure of the device is divided into different functional units, to implement all or some of the functions described above. In addition, the apparatus embodiments and the method embodiments provided in the foregoing embodiments belong to one conception. For a specific implementation process of the apparatus embodiments, reference may be made to the method embodiments, and details are not described herein again.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 8:
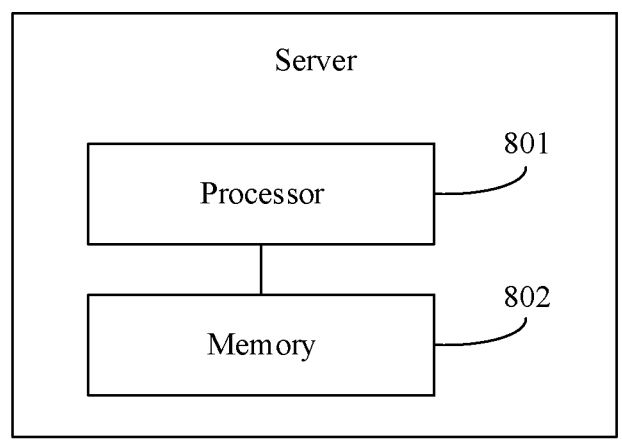
FIG. 8 is a schematic structural diagram of a server according to an embodiment of this disclosure.

FIG. 8 is a schematic structural diagram of a server according to an embodiment of this disclosure. The server may vary greatly because a configuration or performance varies, and may include processing circuitry, such as one or more central processing units (CPU) 801, and one or more memories 802. The one or more memories 802 store at least one computer program, and the at least one computer program is loaded and executed by the one or more processors 801 to cause the server to implement the data query method provided in the foregoing various method embodiments. The server may further include components such as a wired or wireless network interface, a keyboard, and an input/output interface, to facilitate inputs/outputs. The server may further include another component configured to implement functions of a device, and details are not described herein again.

In an exemplary embodiment, a computer device is further provided, including a processor and a memory, the memory storing at least one computer program. The at least one computer program is executed by one or more processors, to cause the computer device to implement any one of the foregoing data query methods.

In an exemplary embodiment, a non-volatile computer-readable storage medium or a non-transitory computer-radable storage medium is further provided, storing at least one computer program, the at least one computer program being loaded and executed by a processor of a computer device, to cause a computer to implement any one of the foregoing data query methods.

In a possible implementation, the non-volatile computer-readable storage medium or the non-transitory computer-readable storage medium may be a read-only memory (ROM), a random access memory (random-access memory, RAM), a compact disc read-only memory (CD-ROM), a magnetic tape, a floppy disk, and an optical data storage device.

In an exemplary embodiment, a computer program product or a computer program is further provided, the computer program product or the computer program including computer instructions, the computer instructions being stored in a computer-readable storage medium, a processor of a computer device reading the computer instructions from the computer-readable storage medium, and the processor executing the computer instructions to cause the computer device to perform any one of the foregoing data query methods.

In the specification and claims of this disclosure, the terms "first", "second", and the like are intended to distinguish between similar objects but do not indicate a particular order or sequence. It is to be understood that the data termed in such a way are interchangeable in proper circumstances, so that the embodiments of this disclosure described herein can be implemented in other orders than the order illustrated or described herein. The following implementations described in the following exemplary embodiments do not represent all implementations that are consistent with this disclosure.

It is to be understood that "plurality of" mentioned in this specification means two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects.

The foregoing descriptions are merely examples of the embodiments of this disclosure, but are not intended to limit this disclosure. Other embodiments are within the scope of this disclosure.

What is claimed is:

1. A data query method, the method comprising:
obtaining a data query request for a target data model;
determining, by processing circuitry of a relational online analytical processing (ROLAP) engine and based on the data query request and target metadata of a plurality of physical tables corresponding to the target data model, a target physical table corresponding to the data query request from the plurality of physical tables corresponding to the target data model, the target metadata being determined based on the plurality of physical tables, the plurality of physical tables including a basic table and a pre-aggregated table, the basic table being configured to record basic data of one granularity, and the pre-aggregated table being configured to record data of a plurality of granularities;
determining a target structured query statement based on the data query request and table identification information of the determined target physical table; and
executing, by the ROLAP engine, the target structured query statement in a database storing the target physical table, to obtain target query data corresponding to the data query request.

2. The method according to claim 1, wherein the data query request includes a to-be-queried measure; and
the determining comprises:
determining a logic dimension set corresponding to the data query request;
determining a query condition based on a model identifier of the target data model and the to-be-queried measure;
querying a first query result matching the query condition from the target metadata, the first query result including at least one query subresult, and a query subresult of the at least one query subresult including a table identifier of one of the plurality of physical tables corresponding to the target data model;
filtering the first query result based on the logic dimension set to obtain a second query result, and determining a query subresult meeting a selection condition in the second query result as a target query subresult; and
determining a physical table indicated by a table identifier included in the target query subresult as the target physical table corresponding to the data query request.

3. The method according to claim 2, wherein the determining the logic dimension set comprises:
forming, based on the data query request including a to-be-queried dimension, the logic dimension set corresponding to the data query request through the to-be-queried dimension;
determining, based on the data query request including filter condition information, a reference dimension corresponding to the filter condition information, and forming the logic dimension set corresponding to the data query request through the reference dimension;
determining, based on the data query request including the to-be-queried dimension and the filter condition information, a reference dimension corresponding to the filter condition information, and determining the logic dimension set corresponding to the data query request based on a union of the to-be-queried dimension and the reference dimension; and
determining, based on the data query request not including the to-be-queried dimension and the filter condition information, an empty set as the logic dimension set corresponding to the data query request.

4. The method according to claim 2, wherein
the data query request further includes a to-be-queried dimension and filter condition information;
the query subresult further includes matching dimensions and non-aggregatable dimensions; and
the filtering the first query result comprises:
deleting a query subresult including matching dimensions not meeting a first condition from the first query result to obtain a reference query result, the not meeting the first condition indicating that the included matching dimensions do not include all dimensions in the logic dimension set; and
deleting a query subresult including non-aggregatable dimensions not meeting a second condition from the reference query result to obtain a second query result, the not meeting the second condition indicating that the included non-aggregatable dimensions include a non-aggregatable dimension that does not belong to the to-be-queried dimension and does not belong to a dimension corresponding to a single filter condition indicated by the filter condition information.

5. The method according to claim 2, wherein
the at least one query subresult in the first query result is arranged in ascending order of the number of matching dimensions or arranged in descending order of the number of matching dimensions;
an arrangement sequence of query subresults in the second query result is the same as an arrangement sequence of corresponding query subresults in the first query result; and
the determining the query subresult meeting the selection condition in the second query result as the target query subresult comprises:
determining, based on the at least one query subresult in the first query result being arranged in ascending order of the number of matching dimensions, a query subresult ranked first in the second query result as the target query subresult; and
determining, based on the at least one query subresult in the first query result being arranged in descending order of the number of matching dimensions, a query subresult ranked last in the second query result as the target query subresult.

6. The method according to claim 1, wherein
the target physical table is the pre-aggregated table;
the data query request includes a to-be-queried dimension, a to-be-queried measure, and filter condition information;
the target physical table is a physical table indicated by a table identifier included in a target query subresult, and the target query subresult further includes a target dimension combination subset; and
the determining the target structured query statement comprises:
determining a dimension query statement based on the to-be-queried dimension;
determining a measure query statement based on the to-be-queried measure;
determining a filter condition query statement based on the filter condition information;
determining a physical table query statement based on the table identifier of the target physical table;
determining a dimension constraint query statement based on the target dimension combination subset and at least one target pre-aggregation dimension corresponding to the target physical table;

determining a target model related column based on a union of a model related column corresponding to the dimension query statement, a model related column corresponding to the measure query statement, a model related column corresponding to the filter condition query statement, and a model related column corresponding to the dimension constraint query statement;

determining a model related column query statement based on an expression of the target model related column; and determining the target structured query statement based on the dimension query statement, the measure query statement, the filter condition query statement, the physical table query statement, the dimension constraint query statement, and the model related column query statement.

7. The method according to claim 6, wherein the target dimension combination subset is one reference dimension combination subset in at least one reference dimension combination subset determined based on the at least one target pre-aggregation dimension; and the determining the dimension constraint query statement comprises:

determining a first summary identifier corresponding to a first dimension, the first dimension including a dimension in the target dimension combination subset;

determining a second summary identifier corresponding to a second dimension, the second dimension including a dimension that is different from the first dimension in the at least one target pre-aggregation dimension; and determining a query statement indicating that the first dimension does not include the first summary identifier and the second dimension includes the second summary identifier as the dimension constraint query statement.

8. The method according to claim 7, wherein the at least one reference dimension combination subset is obtained by one of performing random combination on the at least one target pre-aggregation dimension, performing layered combination on the at least one target pre-aggregation dimension, and performing separate combination on the at least one target pre-aggregation dimension.

9. The method according to claim 7, where the number of granularities of data recorded in the target physical table is the same as the number of the at least one reference dimension combination subset.

10. The method according to claim 1, wherein before the determining, the method further comprises:

obtaining the plurality of physical tables corresponding to the target data model;

determining the target metadata corresponding to the target data model based on the plurality of physical tables; and storing the plurality of physical tables in a relational database and the target metadata in a metadata database.

11. A data query apparatus, comprising:

processing circuitry of a relational online analytical processing (ROLAP) engine, the processing configured being to:

obtain a data query request for a target data model;

determine, based on the data query request and target metadata of a plurality of physical tables corresponding to the target data model, a target physical table corresponding to the data query request from the plurality of physical tables corresponding to the target data model, the target metadata being determined based on the plurality of physical tables, the plurality of physical tables including a basic table and a pre-aggregated table, the basic table being configured to record basic data of one granularity, and the pre-aggregated table being configured to record data of a plurality of granularities;

determine a target structured query statement based on the data query request and table identification information of the determined target physical table; and executing the target structured query statement in a database storing the target physical table, to obtain target query data corresponding to the data query request.

12. The data query apparatus according to claim 11, wherein the data query request includes a to-be-queried measure; and the processing circuitry is configured to:

determine a logic dimension set corresponding to the data query request;

determine a query condition based on a model identifier of the target data model and the to-be-queried measure;

query a first query result matching the query condition from the target metadata, the first query result including at least one query subresult, and a query subresult of the at least one query subresult including a table identifier of one of the plurality of physical tables corresponding to the target data model;

filter the first query result based on the logic dimension set to obtain a second query result, and determine a query subresult meeting a selection condition in the second query result as a target query subresult; and determine a physical table indicated by a table identifier included in the target query subresult as the target physical table corresponding to the data query request.

13. The data query apparatus according to claim 12, wherein the processing circuitry is configured to:

form, based on the data query request including a to-be-queried dimension, the logic dimension set corresponding to the data query request through the to-be-queried dimension;

determine, based on the data query request including filter condition information, a reference dimension corresponding to the filter condition information, and form the logic dimension set corresponding to the data query request through the reference dimension;

determine, based on the data query request including the to-be-queried dimension and the filter condition information, a reference dimension corresponding to the filter condition information, and determine the logic dimension set corresponding to the data query request based on a union of the to-be-queried dimension and the reference dimension; and determine, based on the data query request not including the to-be-queried dimension and the filter condition information, an empty set as the logic dimension set corresponding to the data query request.

14. The data query apparatus according to claim 12, wherein the data query request further includes a to-be-queried dimension and filter condition information;

the query subresult further includes matching dimensions and non-aggregatable dimensions; and the processing circuitry is configured to:
  delete a query subresult including matching dimensions not meeting a first condition from the first query result to obtain a reference query result, the not meeting the first condition indicating that the included matching dimensions do not include all dimensions in the logic dimension set; and
  delete a query subresult including non-aggregatable dimensions not meeting a second condition from the reference query result to obtain a second query result, the not meeting the second condition indicating that the included non-aggregatable dimensions include a non-aggregatable dimension that does not belong to the to-be-queried dimension and does not belong to a dimension corresponding to a single filter condition indicated by the filter condition information.

15. The data query apparatus according to claim 12, wherein
  the at least one query subresult in the first query result is arranged in ascending order of the number of matching dimensions or arranged in descending order of the number of matching dimensions;
  an arrangement sequence of query subresults in the second query result is the same as an arrangement sequence of corresponding query subresults in the first query result; and
  the processing circuitry is configured to:
    determine, based on the at least one query subresult in the first query result being arranged in ascending order of the number of matching dimensions, a query subresult ranked first in the second query result as the target query subresult; and
    determine, based on the at least one query subresult in the first query result being arranged in descending order of the number of matching dimensions, a query subresult ranked last in the second query result as the target query subresult.

16. The data query apparatus according to claim 11, wherein
  the target physical table is the pre-aggregated table;
  the data query request includes a to-be-queried dimension, a to-be-queried measure, and filter condition information;
  the target physical table is a physical table indicated by a table identifier included in a target query subresult, and the target query subresult further includes a target dimension combination subset; and
  the processing circuitry is configured to:
    determine a dimension query statement based on the to-be-queried dimension;
    determine a measure query statement based on the to-be-queried measure;
    determine a filter condition query statement based on the filter condition information;
    determine a physical table query statement based on the table identifier of the target physical table;
    determine a dimension constraint query statement based on the target dimension combination subset and at least one target pre-aggregation dimension corresponding to the target physical table;
    determine a target model related column based on a union of a model related column corresponding to the dimension query statement, a model related column corresponding to the measure query statement, a model related column corresponding to the filter condition query statement, and a model related column corresponding to the dimension constraint query statement;
    determine a model related column query statement based on an expression of the target model related column; and
    determine the target structured query statement based on the dimension query statement, the measure query statement, the filter condition query statement, the physical table query statement, the dimension constraint query statement, and the model related column query statement.

17. The data query apparatus according to claim 16, wherein
  the target dimension combination subset is one reference dimension combination subset in at least one reference dimension combination subset determined based on the at least one target pre-aggregation dimension; and
  the processing circuitry is configured to:
    determine a first summary identifier corresponding to a first dimension, the first dimension including a dimension in the target dimension combination subset;
    determine a second summary identifier corresponding to a second dimension, the second dimension including a dimension that is different from the first dimension in the at least one target pre-aggregation dimension; and
    determine a query statement indicating that the first dimension does not include the first summary identifier and the second dimension includes the second summary identifier as the dimension constraint query statement.

18. A non-transitory computer-readable storage medium, storing instructions which when executed by a processor of a relational online analytical processing (ROLAP) engine cause the processor to perform:
  obtaining a data query request for a target data model;
  determining, based on the data query request and target metadata of a plurality of physical tables corresponding to the target data model, a target physical table corresponding to the data query request from the plurality of physical tables corresponding to the target data model, the target metadata being determined based on the plurality of physical tables, the plurality of physical tables including a basic table and a pre-aggregated table, the basic table being configured to record basic data of one granularity, and the pre-aggregated table being configured to record data of a plurality of granularities;
  determining a target structured query statement based on the data query request and table identification information of the determined target physical table; and
  executing the target structured query statement in a database storing the target physical table, to obtain target query data corresponding to the data query request.

19. The method according to claim 1, wherein the data query request includes a logical structured query language (SQL) query and the target structured query statement includes a physical SQL query.

* * * * *